US012675269B2

(12) United States Patent
Zemła

(10) Patent No.: US 12,675,269 B2
(45) Date of Patent: Jul. 7, 2026

(54) CONTAINERIZED, DECENTRALIZED, AND DISTRIBUTED WEB APPLICATIONS WITH END-TO-END ENCRYPTION

(71) Applicant: Shore Labs Zbigniew Zemła, Katowice (PL)

(72) Inventor: Zbigniew Józef Zemła, Katowice (PL)

(73) Assignee: Shore Labs Zbigniew ZEMŁA, Katowice (PL)

( * ) Notice: Subject to any disclaimer, the term of this patent is extended or adjusted under 35 U.S.C. 154(b) by 0 days.

(21) Appl. No.: 18/467,502

(22) Filed: Sep. 14, 2023

(65) Prior Publication Data

US 2023/0418583 A1     Dec. 28, 2023

Related U.S. Application Data

(62) Division of application No. 17/655,341, filed on Mar. 17, 2022, now Pat. No. 11,797,289.

(51) Int. Cl.
*G06F 8/61* (2018.01)
*H04L 67/141* (2022.01)

(52) U.S. Cl.
CPC .................. *G06F 8/63* (2013.01); *G06F 8/62* (2013.01); *H04L 67/141* (2013.01)

(58) Field of Classification Search
CPC ............. G06F 8/62; G06F 8/63; H04L 67/141
See application file for complete search history.

(56) References Cited

U.S. PATENT DOCUMENTS 7,120,927 B1 * 10/2006 Beyda ................... H04L 51/212
                                                                   713/153
8,671,384 B2     3/2014 Hilerio et al.
(Continued)

FOREIGN PATENT DOCUMENTS

WO     2011/156155 A2     12/2011
WO     2022/266364 A1     12/2022

OTHER PUBLICATIONS

Amir Herzberg et al., "DNS-based email sender authentication mechanisms: A critical review," 2009 [retrieved on Dec. 13, 2024], Computers & Security, vol. 28, Issue 8, pp. 731-742, downloaded from <url>:https://www.sciencedirect.com. (Year: 2009).*

(Continued)

*Primary Examiner* — S. Sough
*Assistant Examiner* — Stephen D Berman
(74) *Attorney, Agent, or Firm* — Nicholson, De Vos, Webster & Elliott, LLP

(57) ABSTRACT

A method performed by a relay server for facilitating communications between a web application executing in a web browser and one or more client computing devices. The method includes receiving a selected domain name under which the web application is to be registered, verifying that the web application is allowed to be registered under the selected domain name based on accessing a record associated with the selected domain name in a domain name system (DNS) database, registering the web application under the selected domain name, relaying messages associated with the selected domain name that are received from the one or more client computing devices to the web application over a first bidirectional communication connection established between the web application and the relay server, and relaying messages received from the web application over the first bidirectional communication connection to respective ones of the one or more client computing devices.

20 Claims, 14 Drawing Sheets

(56) References Cited

U.S. PATENT DOCUMENTS

| | | | | |
|---|---|---|---|---|
| 9,002,808 | B1 * | 4/2015 | Liu | G06F 16/168 |
| | | | | 707/694 |
| 9,164,671 | B2 | 10/2015 | Hilerio et al. | |
| 9,894,057 | B2 * | 2/2018 | Wang | H04L 63/0823 |
| 11,252,252 | B2 | 2/2022 | Boodman et al. | |
| 2004/0139227 | A1 * | 7/2004 | Takeda | H04L 67/02 |
| | | | | 709/230 |
| 2005/0267760 | A1 * | 12/2005 | Meyer | H04R 29/008 |
| | | | | 704/270.1 |
| 2007/0033569 | A1 | 2/2007 | Davidson et al. | |
| 2009/0282248 | A1 * | 11/2009 | Dias | G06F 21/6218 |
| | | | | 713/170 |
| 2009/0313472 | A1 | 12/2009 | Guccione et al. | |
| 2010/0017598 | A1 * | 1/2010 | Rodriguez | H04L 51/48 |
| | | | | 709/206 |
| 2011/0138059 | A1 * | 6/2011 | Schleifer | G06F 9/541 |
| | | | | 709/227 |
| 2012/0079088 | A1 * | 3/2012 | Nicholson | H04L 61/4511 |
| | | | | 709/223 |
| 2014/0040979 | A1 | 2/2014 | Barton et al. | |
| 2015/0312190 | A1 | 10/2015 | Rankin et al. | |
| 2015/0317171 | A1 | 11/2015 | Blazek | |
| 2016/0057243 | A1 * | 2/2016 | Gupta | H04L 67/563 |
| | | | | 709/203 |
| 2016/0191645 | A1 | 6/2016 | Hayton et al. | |
| 2016/0316364 | A1 | 10/2016 | Blanco et al. | |
| 2017/0093587 | A1 | 3/2017 | Glisson | |
| 2017/0154017 | A1 | 6/2017 | Kristiansson et al. | |
| 2018/0018150 | A1 | 1/2018 | Liu et al. | |
| 2019/0068578 | A1 | 2/2019 | Balakrishnan et al. | |
| 2019/0158353 | A1 * | 5/2019 | Johnson | H04L 63/0823 |
| 2020/0356397 | A1 | 11/2020 | Kumatagi et al. | |
| 2021/0117308 | A1 | 4/2021 | Burgos | |
| 2022/0029796 | A1 | 1/2022 | Peddada et al. | |
| 2022/0116390 | A1 | 4/2022 | Jass et al. | |
| 2022/0131852 | A1 | 4/2022 | Sharma et al. | |
| 2024/0195801 | A1 | 6/2024 | Novick et al. | |

OTHER PUBLICATIONS

Roberto Perdisci et al., "WSEC DNS: Protecting recursive DNS resolvers from poisoning attacks," 2009 [retrieved on Dec. 14, 2024], 2009 IEEE/IFIP International Conference on Dependable Systems & Networks, pp. 3-12, downloaded from <url>:https:// ieeexplore.ieee.org. (Year: 2009).*

T. Hansen et al., "DomainKeys Identified Mail (DKIM) Service Overview," Network Working Group Request for Comments: 5585, pp. 1-23, downloaded from <url>:https://d1wqtxts1xzle7.cloudfront. net (Year: 2009).*

Eiji Kitamura, "Gaining security and privacy by partitioning the cache," 2020 [retrieved Jun. 9, 2025], pp. 1-14, downloaded from <url>: https://web.archive.org/web/20220316020848/https://developer. chrome.com/blog/http-cache-partitioning. (Year: 2020).*

Yutang Ling et al., "Zero to Hero with App Service, Part 5: Add and Secure a Custom Domain on Your Azure App Service Web App, " Jul. 28, 2020 [retrieved Sep. 10, 2025], pp. 1-9, downloaded from <url>:https://azure.github.io/AppService/2020/07/28/zero_to_hero_ pt5.html. ( Year: 2020).*

Microsoft Azure, "Internals of App Service Certificate," 2016 [retrieved Sep. 11, 2025], pp. 1-13, downloaded from <url>:https:// azure.microsoft.com/en-us/blog/internals-of-app-service-certificate/. (Year: 2016).*

Ken Murata et al., "Development of High-Performance and Flexible Protocol Handler for International Web Accesses", 2019 [retrieved Jan. 24, 2026], pp. 1958-1963, downloaded from <url>:https:// ieeexplore.ieee.org/document/8855366?source=IQplus. (Year: 2019).*

Siva Kesava Reddy Kakarla et al., "GRooT: Proactive Verification of DNS Configurations", 2020 [retrieved Jan. 24, 2026], pp. 310-328, downloaded from <url>:https://dl.acm.org/doi/abs/10.1145/ 3387514.3405871. (Year: 2020).*

Advisory Action, U.S. Appl. No. 176/55,341, Feb. 6, 2023, 3 pages.

Amadeo, R., "Chrome Apps are dead, as Google shuts down the Chrome Web Store section", Ars Technica, Available Online at <https://arstechnica.com/gadgets/2017/12/google-shuts-down-the-apps-section-of-the-chrome-web-store/>, Dec. 6, 2017, pp. 1-6.

Apple, "iPhone to Support Third-Party Web 2.0 Applications", Newsroom, Press Release, Available Online at <https://www.apple. com/newsroom/2007/06/11iPhone-to-Support-Third-Party-Web-2-0-Applications/>, Jun. 11, 2007, pp. 1-3.

caniuse.com, "Offline web applications", Support tables for HTML5, CSS3, etc., Available Online at <https://caniuse.com/offline-apps>, Statistics for Feb. 2022, Retrieved Mar. 15, 2022, pp. 1-2.

Citrix Systems, Inc., "What is containerization?", Containerization Definition, Available Online at <https://www.citrix.com/solutions/ app-delivery-and-security/what-is-containerization.html>, Retrieved Mar. 15, 2022, , pp. 1-10.

Final Office Action, U.S. Appl. No. 17/655,341, Oct. 31, 2022, 29 pages.

Google Developers, "Google I/O 2012—The Next Evolution of Chrome Apps", Available Online at <transcriptvids.com/v/j80FAr1YR-0.html>, Jun. 28, 2012, pp. 1-13.

Google Developers, "Introduction to Service Worker", Available Online at <https://developers.google.com/web/ilt/pwa/introduction-to-service-worker>, Jun. 10, 2019, Retrieved Mar. 15, 2022, pp. 1-8.

Google, "Understand the Architecture", Chrome Apps Stable, Available Online at <https://web.archive.org/web/20130621085400/http:/ developer.chrome.com/apps/app_architecture.html>, Jun. 21, 2013, Retrieved Mar. 15, 2022, pp. 1-3.

Google, "What Are Packaged Apps?", Google Chrome Apps, Available Online at <https://web.archive.org/web/20120908054313/http:/ developer.chrome.com:80/apps/about_apps.html>, Sep. 8, 2012, Retrieved Mar. 15, 2022, pp. 1-3.

International Search Report and Written Opinion, PCT App. No. PCT/IB2023/052547, Jun. 28, 2023, 10 pages.

Lepage, P., "Persistent storage," <https://web.dev/persistent-storage/ >, Creative Commons Attribution 4.0 License, Apache 2.0 License, May 12, 2020, 7 pages.

Linode, "Object Storage: High availability S3-compatible object storage", Available Online at <https://www.linode.com/products/ object-storage/>, Retrieved Mar. 15, 2022, pp. 1-11.

Mahemoff, M., "Extensions, Packaged Apps, and Hosted Apps in the Chrome Web Store", Chrome Web Store, Available Online at <https://web.archive.org/web/20121015142440/https:/developers. google.com/chrome/web-store/articles/apps_vs_extensions>, Sep. 2010, pp. 1-3.

MDN, "Cache", Web APIs, Available Online at <https://developer. mozilla.org/en-us/docs/Web/API/Cache>, Mar. 2, 2022, Retrieved Mar. 15, 2022, pp. 1-11.

MDN, "Origin", MDN Web Docs Glossary: Definitions of Web-related terms, Available Online at <https://developer.mozilla.org/ en-US/docs/Glossary/Origin>, Oct. 7, 2021, Retrieved Mar. 15, 2022, pp. 1-2.

MDN, "Same-origin policy", Web security, Available Online at <https://developer.mozilla.org/en-US/docs/Web/Security/Same-origin_ policy>, Feb. 7, 2022, Retrieved Mar. 15, 2022, pp. 1-8.

MDN, "ServiceWorker", Web APIs, Available Online at <https:// developer.mozilla.org/en-US/docs/Web/API/ServiceWorker>, Feb. 3, 2022, Retrieved Mar. 15, 2022, pp. 1-6.

Microsoft Azure, "What is a container?", Standardized, portable packaging for your applications, Available Online at <https://azure. microsoft.com/en-us/overview/what-is-a-container/#overview>, 2022, Retrieved Mar. 15, 2022, pp. 1-12.

Microsoft Edge Development, "Overview of Progressive Web Apps (PWAs)", Microsoft Docs, Available Online at <https://docs.microsoft. com/en-us/microsoft-edge/progressive-web-apps-chromium/>, Feb. 28, 2022, pp. 1-6.

Microsoft Edge Development, "Use a Web App Manifest to integrate a Progressive Web App into the operating system", Available Online at <https://docs.microsoft.com/en-us/microsoft-edge/progressive-web-apps-chromium/how-to/web-app-manifests>, Jan. 24, 2022, pp. 1-6.

Non-Final Office Action, U.S. Appl. No. 17/655,341, Jun. 8, 2022, 21 pages.

(56)  References Cited

OTHER PUBLICATIONS

Non-Final Office Action, U.S. Appl. No. 17/655,341, Mar. 10, 2023, 31 pages.
Notice of Allowance, U.S. Appl. No. 17/655,341, Jun. 15, 2023, 14 pages.
Posnick, J., "Using Web Transport", Available Online at <https://web.dev/webtransport/>, Jun. 8, 2020, pp. 1-14.
Russell, A., "Progressive Web Apps: Escaping Tabs Without Losing Our Soul", Available Online at <https://medium.com/@slightlylate/progressive-apps-escaping-tabs-without-losing-our-soul-3b93a8561955>, Aug. 10, 2015, pp. 1-11.
Scandipwa, "History of Progressive Web Apps", Published in Progressive Web Apps, Available Online at <https://medium.com/progressivewebapps/history-of-progressive-web-apps-4c912533a531>, Jul. 19, 2019, pp. 1-5.
Tante, "The Third Web", Version 1.1, Available Online at <https://tante.cc/2021/12/17/the-third-web/#ENDBOX>, Dec. 17, 2021, pp. 1-30.
Wikipedia, "Amazon S3", Available Online at <https://en.wikipedia.org/wiki/Amazon_S3>, Mar. 14, 2022, Retrieved on Mar. 15, 2022, pp. 1-13.
Wikipedia, "AWS Lambda", Available Online at <https://en.wikipedia.org/wiki/AWS_Lambda>, Nov. 11, 2021, Retrieved on Mar. 15, 2022, pp. 1-3.
Wikipedia, "Bootloader", Available Online at <https://en.wikipedia.org/wiki/Bootloader>, Mar. 9, 2022, Retrieved Mar. 15, 2022, pp. 1-6.
Wikipedia, "Decentralization", Available Online at <https://en.wikipedia.org/wiki/Decentralization#Technological_decentralization>, Feb. 17, 2022, Retrieved Mar. 15, 2022, pp. 1-33.
Wikipedia, "Distributed computing", Available Online at <https://en.wikipedia.org/wiki/Distributed_computing>, Jan. 12, 2022, Retrieved Mar. 15, 2022, pp. 1-14.
Wikipedia, "DNS over HTTPS", Available Online at <https://en.wikipedia.org/wiki/DNS_over_HTTPS>, Mar. 3, 2022, Retrieved Mar. 15, 2022, pp. 1-10.
Wikipedia, "Domain Name System", Available Online at <https://en.wikipedia.org/wiki/Domain_Name_System>, Mar. 7, 2022, Retrieved Mar. 15, 2022, pp. 1-22.
Wikipedia, "End-to-end encryption", Available Online at <https://en.wikipedia.org/wiki/End-to-end_encryption>, Mar. 2, 2022, Retrieved Mar. 15, 2022, pp. 1-8.
Wikipedia, "Progressive web application", Available Online at <https://en.wikipedia.org/wiki/Progressive_web_application>, Mar. 15, 2022, Retrieved Mar. 15, 2022, pp. 1-8.
Wikipedia, "Proxy server", Available Online at <https://en.wikipedia.org/wiki/Proxy_server>, Feb. 27, 2022, Retrieved Mar. 15, 2022, pp. 1-14.
Wikipedia, "Public-key cryptography", Available Online at <https://en.wikipedia.org/wiki/Public-key_cryptography>, Feb. 28, 2022, Retrieved Mar. 15, 2022, pp. 1-11.
Wikipedia, "Snapshot (computer storage)", Available Online at <https://en.wikipedia.org/wiki/Snapshot_(computer_storage)>, Dec. 16, 2021, Retrieved Mar. 15, 2022, pp. 1-3.
Wikipedia, "V8 (JavaScript engine)", Available Online at <https://en.wikipedia.org/wiki/V8_(JavaScript_engine)>, Mar. 2, 2022, Retrieved Mar. 15, 2022, pp. 1-4.
Wikipedia, "WebSocket", Available Online at <https://en.wikipedia.org/wiki/WebSocket>, Mar. 6, 2022, Retrieved Mar. 15, 2022, pp. 1-9.
Final Office Action, U.S. Appl. No. 18/667,984, Dec. 10, 2024, 22 pages.
ICANN, "FAQs for Registrants: About ICANN", available online at <https://www.icann.org/resources/pages/about-icann-faqs-2019-02-25-en>, Feb. 25, 2019, 12 pages.
International Search Report and Written Opinion, PCT App. No. PCT/IB2024/054831, Aug. 19, 2024, 16 pages.
Mozilla Contributors, "CryptoKey.extractable", last updated Jan. 28, 2015, available online at <https://web.archive.org/web/20160809024942/https://developer.mozilla.org/en-US/docs/Web/API/CryptoKey/extractable> via The Wayback Machine as retrieved Aug. 9, 2016, 2 pp.
Mozilla Contributors, "Same-origin policy", last edited Feb. 7, 2022, available online at <https://web.archive.org/web/20220316180526/https://developer.mozilla.org/en-US/docs/Web/Security/Same-origin_policy> via The Wayback Machine as retrieved Mar. 16, 2022, pp. 1-8.
Non-Final Office Action, U.S. Appl. No. 18/667,984, Aug. 27, 2024, 21 pages.
Non-Final Office Action, U.S. Appl. No. 18/667,984, Mar. 6, 2025, 25 pages.
RFC 1034: P. Mockapetris, "Domain Names—Concepts and Facilities", Request for Comments: 1034, Nov. 1987, 55 pages.
RFC 1035: P. Mockapetris, "Domain Names—Implementation and Specification", Request for Comments: 1035, Nov. 1987, 55 pages.
Stack Exchange Inc., "What do people use non-extractable WebCrypto keys for?", Cryptography, available online at <https://web.archive.org/web/20220310055849/https://crypto.stackexchange.com/questions/85587/what-do-people-use-non-extractable-webcrypto-keys-for> via The Wayback Machine as retrieved Mar. 10, 2022, pp. 1-3.
Watson, M., "Web Cryptography API", W3C Recommendation, available online at <https://www.w3.org/TR/WebCryptoAPI/>, Jan. 26, 2017, pp. 1-125.
Wikipedia, "DNS over HTTPS", last edited Mar. 3, 2022, available online at <https://web.archive.org/web/20220307142145/https://en.wikipedia.org/wiki/DNS_over_HTTPS> via The Wayback Machine as retrieved Mar. 7, 2022, pp. 1-11.
Wikipedia, "DNS-based Authentication of Named Entities", last edited Dec. 17, 2021, available online at <https://web.archive.org/web/20220316052237/https://en.wikipedia.org/wiki/DNS-based_Authentication_of_Named_Entities> via The Wayback Machine as retrieved Mar. 16, 2022, pp. 1-8.
Wikipedia, "Domain Name System", last edited Mar. 7, 2022, available online at <https://web.archive.org/web/20220316014255/https://en.wikipedia.org/wiki/Domain_Name_System> via The Wayback Machine as retrieved Mar. 16, 2022, pp. 1-24.
Wikipedia, "DomainKeys Identified Mail", last edited Mar. 1, 2022, available online at <https://web.archive.org/web/20220315190051/https://en.wikipedia.org/wiki/DomainKeys_Identified_Mail> via The Wayback Machine as retrieved Mar. 15, 2022, pp. 1-13.
Wikipedia, "In technology and the Internet" from "Decentralization", last edited Feb. 9, 2025, available online at <https://en.wikipedia.org/wiki/Decentralization#In_technology_and_the_Internet>, retrieved Feb. 12, 2025, pp. 13-16 of 30.
Wikipedia, "Integrated Encryption Scheme", available online at <https://en.wikipedia.org/wiki/Integrated_Encryption_Scheme>, Feb. 2023, 3 pages.
Wikipedia, "Passwordless authentication", last edited Dec. 23, 2021, available online at <https://web.archive.org/web/20220307142244/https://en.wikipedia.org/wiki/Passwordless_authentication> via The Wayback Machine as retrieved Mar. 7, 2022, pp. 1-5.
Wikipedia, "Progressive web application", last edited Mar. 15, 2022, available online at <https://web.archive.org/web/20220316055734/https://en.wikipedia.org/wiki/Progressive_web_application> via The Wayback Machine as retrieved Mar. 16, 2022, pp. 1-9.
Wikipedia, "Public-key cryptography", last edited Feb. 28, 2022, available online at <https://web.archive.org/web/20220316042929/https://en.wikipedia.org/wiki/Public-key_cryptography> via The Wayback Machine as retrieved Mar. 16, 2022, pp. 1-11.
Wikipedia, "WebAuthn", last edited Feb. 18, 2022, available online at <https://web.archive.org/web/20220316055519/https://en.wikipedia.org/wiki/WebAuthn> via The Wayback Machine as retrieved Mar. 16, 2022, pp. 1-8.
ICANN, "List of Accredited Registrars", available online at <https://web.archive.org/web/20220320060248/https://www.icann.org/>, Mar. 20, 2022, 4 pages.
Red Hat, "27.4. Mail Transport Agent (MTA) Configuration," Enterprise Linux 5 Deployment Guide, downloaded from <https://docs.redhat.com/en/documentation/red_hat_enterprise_linux/5/html/deployment_guide/s1-email-switchmail> on Aug. 5, 2025, pages.

(56) References Cited

OTHER PUBLICATIONS

Wikipedia, "Message transfer agent", available online at <https://web.archive.org/web/20220311200826/https://en.wikipedia.org/wiki/Message_transfer_agent>, Mar. 11, 2022, pp. 1-3.

Wikipedia, "Sender Policy Framework", available online at <https://web.archive.org/web/20220316070654/https://en.wikipedia.org/wiki/Sender_Policy_Framework>, Mar. 16, 2022, pp. 1-9.

Bansal, C., Bhargavan, K., Delignat-Lavaud, A. and Maffeis, S., 2014. Discovering concrete attacks on website authorization by formal analysis. Journal of Computer Security, 22(4), pp. 601-657. (Year: 2006).

Garba, A., Chen, Z., Guan, Z. and Srivastava, G., 2021. LightLedger: A novel blockchain-based domain certificate authentication and validation scheme. IEEE Transactions on Network Science and Engineering, 8(2), pp. 1698-1710. (Year: 2019).

Intention to grant, EP App. No. 23714843.2, Feb. 5, 2026, 08 pages.

Notice of Allowance, U.S. Appl. No. 18/667,984, Sep. 23, 2025, 24 pages.

Yutang Lin et al., "Zero to Hero with App Service, Part 5: Add and Secure a Custom Domain on Your Azure App Service Web App", available online at <https://azure.github.io/AppService/2020/07/28/zero_to_hero_pt5.html>, Jul. 28, 2020, 9 pages.

* cited by examiner

Figure 3:
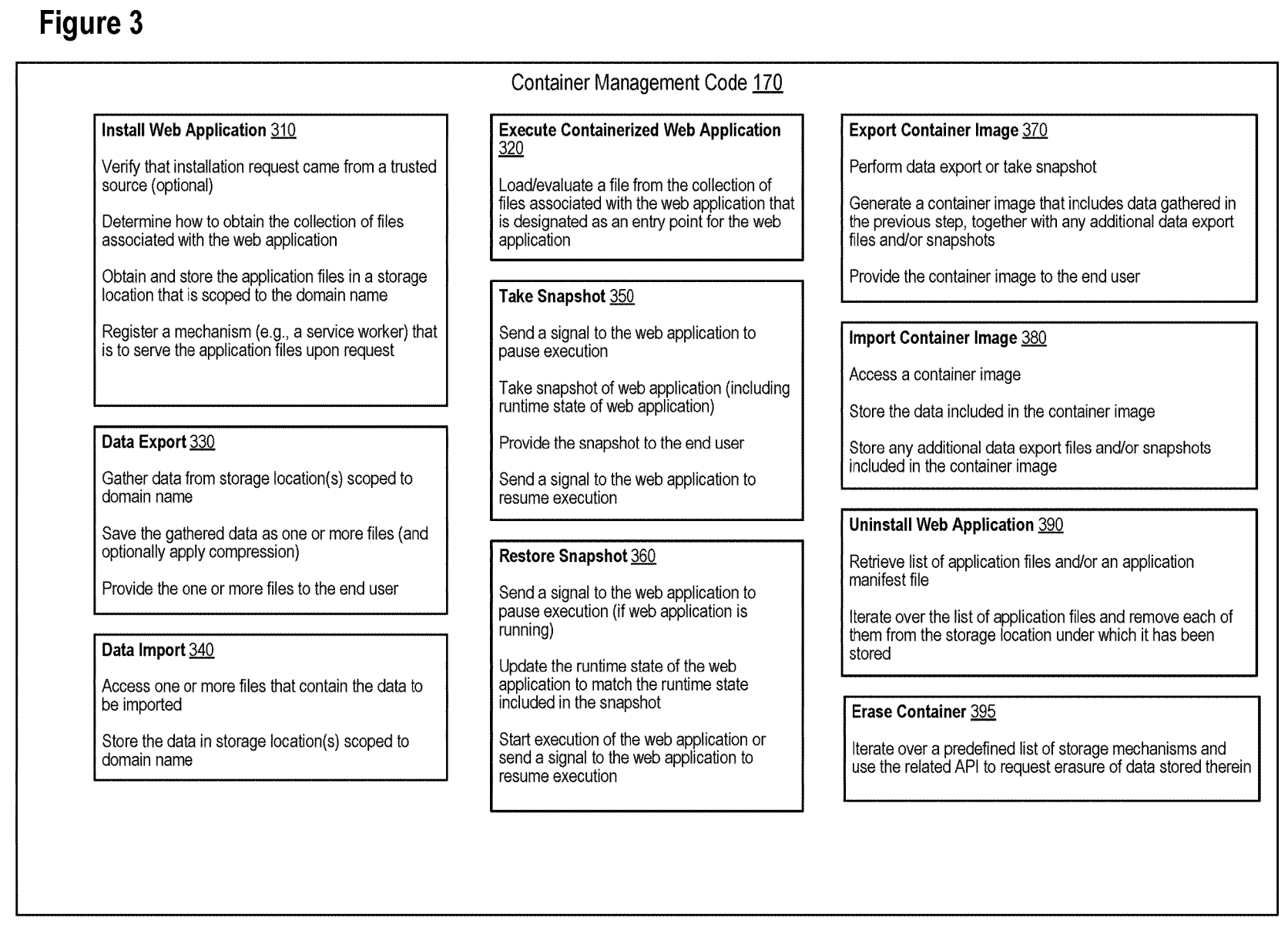

Container Management Code 170

Install Web Application 310

Verify that installation request came from a trusted source (optional)

Determine how to obtain the collection of files associated with the web application Obtain and store the application files in a storage location that is scoped to the domain name Register a mechanism (e.g., a service worker) that is to serve the application files upon request

Execute Containerized Web Application 320

Load/evaluate a file from the collection of files associated with the web application that is designated as an entry point for the web application

Take Snapshot 350

Send a signal to the web application to pause execution

Take snapshot of web application (including runtime state of web application)

Provide the snapshot to the end user

Send a signal to the web application to resume execution

Export Container Image 370

Perform data export or take snapshot

Generate a container image that includes data gathered in the previous step, together with any additional data export files and/or snapshots Provide the container image to the end user

Import Container Image 380

Access a container image

Store the data included in the container image

Store any additional data export files and/or snapshots included in the container image

Data Export 330

Gather data from storage location(s) scoped to domain name

Save the gathered data as one or more files (and optionally apply compression)

Provide the one or more files to the end user

Restore Snapshot 360

Send a signal to the web application to pause execution (if web application is running)

Update the runtime state of the web application to match the runtime state included in the snapshot Start execution of the web application or send a signal to the web application to resume execution

Uninstall Web Application 390

Retrieve list of application files and/or an application manifest file

Iterate over the list of application files and remove each of them from the storage location under which it has been stored

Data Import 340

Access one or more files that contain the data to be imported

Store the data in storage location(s) scoped to domain name

Erase Container 395

Iterate over a predefined list of storage mechanisms and use the related API to request erasure of data stored therein

Figure 11

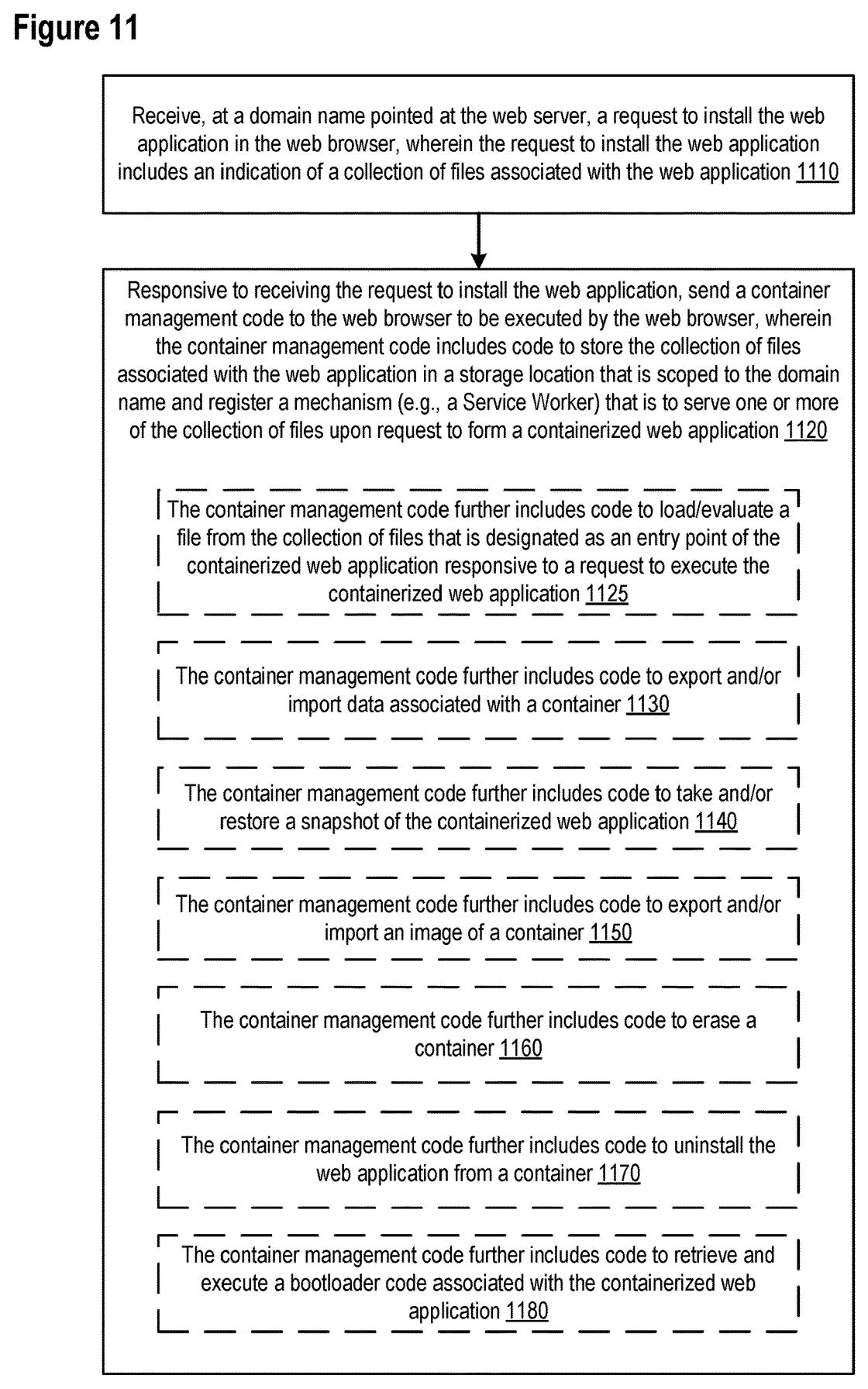

Receive, at a domain name pointed at the web server, a request to install the web application in the web browser, wherein the request to install the web application includes an indication of a collection of files associated with the web application 1110

Responsive to receiving the request to install the web application, send a container management code to the web browser to be executed by the web browser, wherein the container management code includes code to store the collection of files associated with the web application in a storage location that is scoped to the domain name and register a mechanism (e.g., a Service Worker) that is to serve one or more of the collection of files upon request to form a containerized web application 1120

The container management code further includes code to load/evaluate a file from the collection of files that is designated as an entry point of the containerized web application responsive to a request to execute the containerized web application 1125

The container management code further includes code to export and/or import data associated with a container 1130

The container management code further includes code to take and/or restore a snapshot of the containerized web application 1140

The container management code further includes code to export and/or import an image of a container 1150

The container management code further includes code to erase a container 1160

The container management code further includes code to uninstall the web application from a container 1170

The container management code further includes code to retrieve and execute a bootloader code associated with the containerized web application 1180

Figure 12

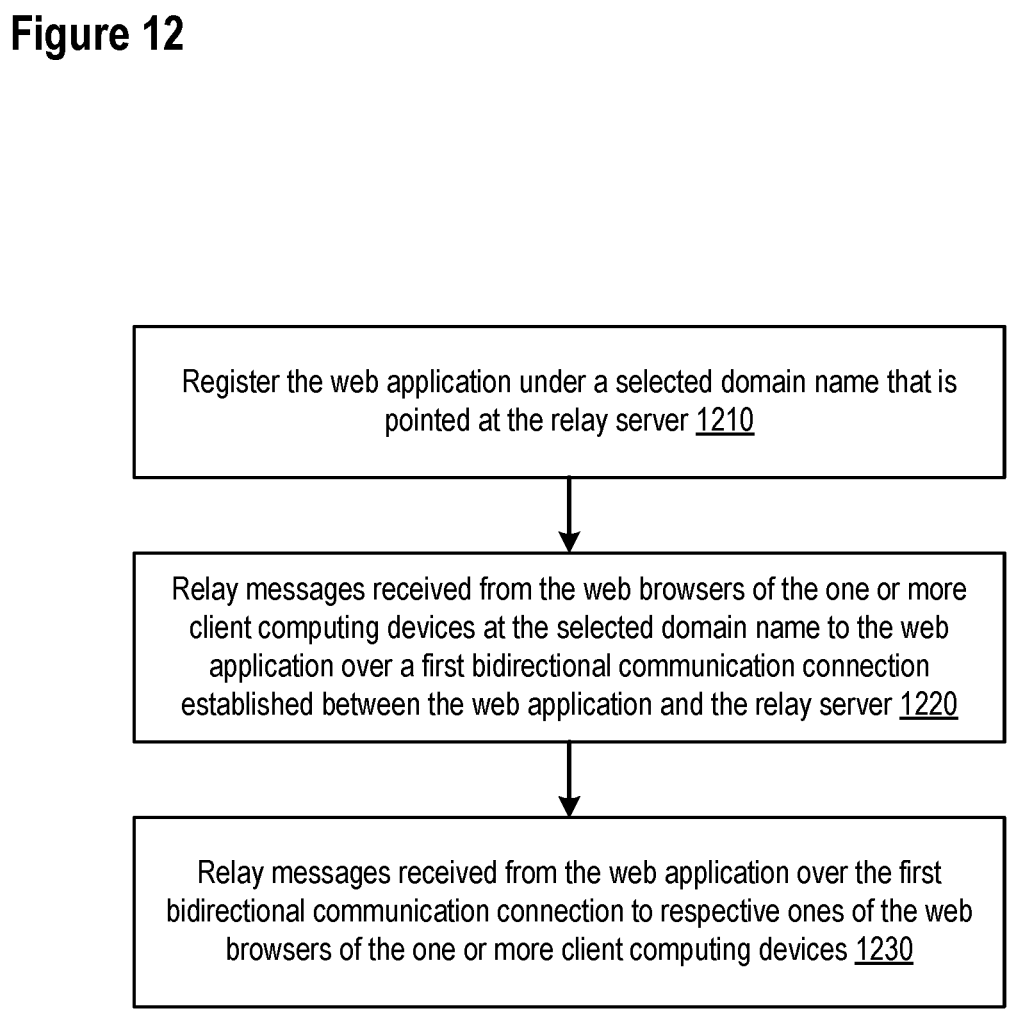

Register the web application under a selected domain name that is pointed at the relay server 1210

Relay messages received from the web browsers of the one or more client computing devices at the selected domain name to the web application over a first bidirectional communication connection established between the web application and the relay server 1220

Relay messages received from the web application over the first bidirectional communication connection to respective ones of the web browsers of the one or more client computing devices 1230

CONTAINERIZED, DECENTRALIZED, AND DISTRIBUTED WEB APPLICATIONS WITH END-TO-END ENCRYPTION

CROSS-REFERENCE TO RELATED APPLICATIONS

This application is a divisional of application Ser. No. 17/655,341, filed Mar. 17, 2022 (now U.S. Pat. No. 11,797, 289), which is hereby incorporated by reference.

TECHNICAL FIELD

Embodiments disclosed herein relate to the field of web applications, and more specifically, to installing a web application into a container within a web browser and facilitating communications between a web application executing in a web browser of a source computing device and web browsers of one or more client computing devices.

BACKGROUND

The Internet, from its original conception, was intended to be decentralized. Starting from the distributed nature of Advanced Research Projects Agency Network (ARPANET) and dial-up-based bulletin board system (BBS), to the creation of the World Wide Web as a collaborative medium, the Internet was user-oriented, decentralized, and users owned and fully controlled their data.

With the growing popularity of the World Wide Web and the influx of non-tech-savvy users came the advent of Web 2.0 and its side effects, particularly the ongoing centralization of Internet services and data under the control of a small group of companies, known as "Big Tech".

The growing discontent with the practices and oligopoly of Big Tech is fueling a movement that emphasizes decentralization and regaining control and ownership of data. However, decentralization is difficult to achieve with the current state of technology.

Even though the amount of computing power and bandwidth available to a typical household computing device (e.g., a desktop, laptop, or mobile phone) is more than sufficient to host a simple web application (e.g., an appointment scheduling web application, a file sharing web application, or a restaurant booking web application), setting up, configuring, and maintaining a web application requires significant effort and expertise due to at least the following reasons: (a) web servers and applications are becoming increasingly more complex, and thus require complex runtime environments which are difficult and time-consuming to build, maintain and backup; (b) commercial Internet service providers typically provide their customers with dynamic Internet Protocol (IP) addresses and block ports that are required to run web servers (HTTP, HTTPS) or receive emails (SMTP); (c) as man-in-the-middle attacks become more common, web servers and applications need to provide at least a basic at-transit encryption of data, which adds additional burden and complexity in setting up and maintaining web applications; and (d) it is difficult for web applications executing on user computing devices to meet scalability and availability requirements.

BRIEF DESCRIPTION OF THE DRAWINGS

The invention may best be understood by referring to the following description and accompanying drawings that are used to illustrate embodiments of the invention. In the drawings:

FIG. 1 is a diagram showing a system in which web applications can be installed into containers within a web browser of a source computing device and be made accessible to client web browsers of client computing devices, according to some embodiments.

FIG. 3 is a diagram showing a container management code, according to some embodiments.

FIG. 11 is a flow diagram showing a method performed by a web server for installing a web application into a container within a web browser, according to some embodiments.

FIG. 12 is a flow diagram showing a method performed by a relay server for facilitating communications between a web application executing in a web browser of a source computing device and web browsers of one or more client computing devices, according to some embodiments.

DETAILED DESCRIPTION

Figure 2:
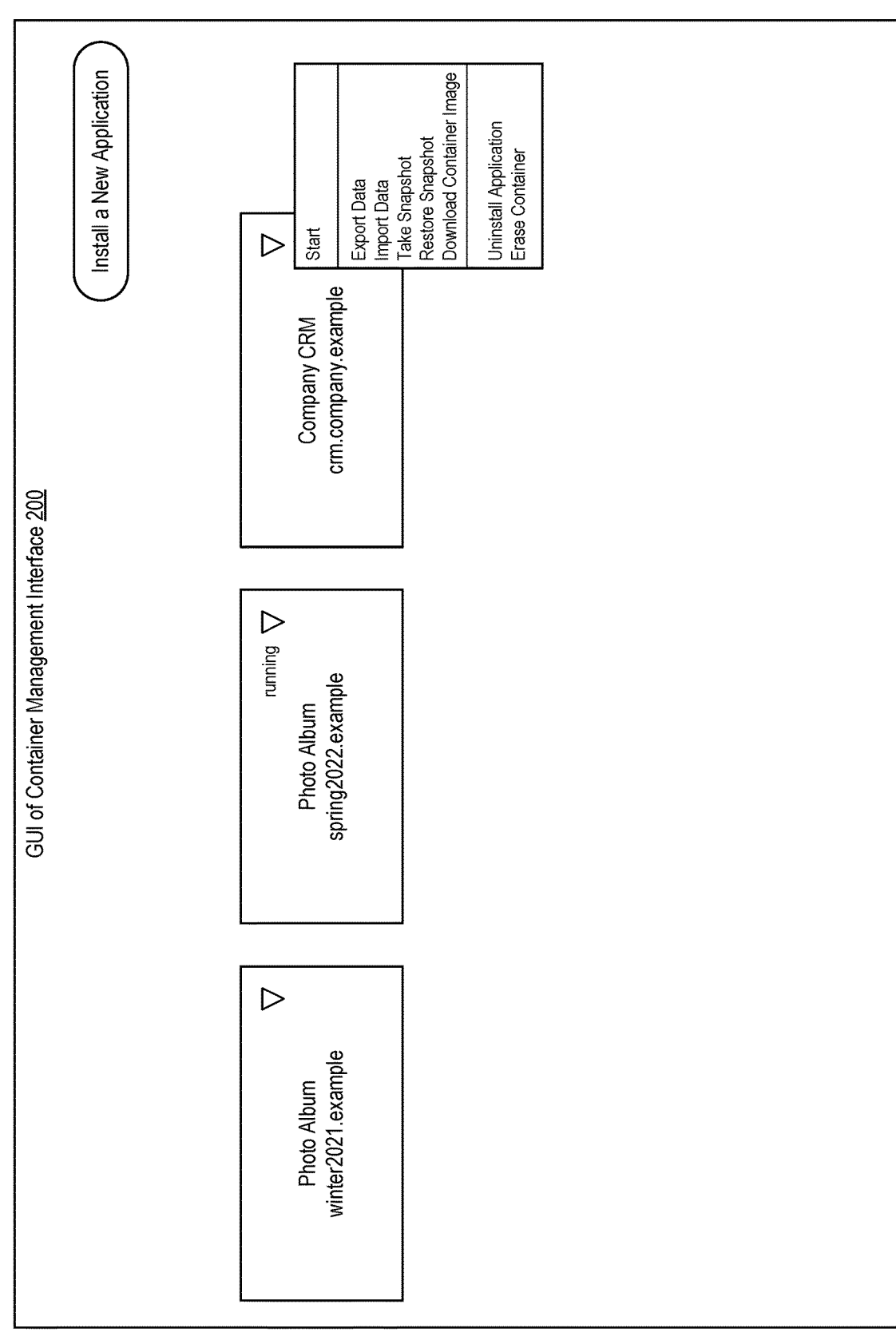
FIG. 2 is a diagram showing a graphical user interface (GUI) of a container management interface application, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

Web applications are applications built using common web technologies such as Hypertext Markup Language (HTML), JavaScript (JS), and Cascading Style Sheets (CSS), that are intended to be run by a web browser.

Installable web applications such as Chrome Packaged Apps, Mozilla Open Web Apps, and Progressive Web Applications (PWAs) are web applications that are intended to be installed in a web browser.

Focus on Client Apps

When looking at the evolution of installable web applications, it can be seen that such applications are either focused on acting as a singular entity that is non-connected and completely independent (e.g., a calculator app) or acting as a client to a larger service (e.g., a centralized social media app). It was not possible with Chrome Packaged Apps and is still not possible with PWAs to install two instances of the same application in a single web browser/device. This makes sense when such applications are thought of as clients. For example, a social media web application installed in a web browser (e.g., a Twitter® progressive web app) may connect to the web servers of the social media service and offer a "progressively enhanced" experience by providing faster load times and offline capabilities. There is no need for multiple instances of such social media web application to execute in the same web browser.

However, when the paradigm is shifted from installable web applications being "clients" to being "servers," such model may no longer be adequate. For example, if there is an installable web application that serves a photo album, it may be desirable to have multiple instances of the installable web application executing in a web browser at the same time with each instance configured in a slightly different way and having access to and serving different sets of photos. In such cases, the installable web application needs to be decoupled from the environment in which it is being executed and from the data that it accesses. Currently, PWAs do not address such needs. As mentioned above, PWAs are non-connected (e.g., others web browsers cannot connect to the PWA) and focus on the client-side experience. Only one instance of a given PWA can be installed in a web browser at a time.

Containment Model

For packaged apps and PWAs, the containment model is a byproduct of their respective architectures. With packaged apps, which evolved from browser extensions, it is natural to execute them in the same security context as browser extensions. Similarly, with PWAs, since individual websites define the PWA manifest, it is natural to use the built-in sandboxing mechanisms of web browsers that is based on uniform resource locators (URLs) and web origin of the "progressively enhanced" website.

However, currently, there is no way for a user to install a web application in a web browser such that it is contained/isolated based on a user-selected domain name. That is, there is no way to decouple the web application from the domain name that is used to contain/isolate the web application.

Lack of Server-Related Methods

Because PWAs focus on client functionality, they did not evolve in a direction that would allow for listening to incoming connections. Even though PWAs and websites in general have access to a variety of rich application programming interfaces (APIs) (e.g., that provide storage mechanisms (e.g., Cache API), database access (e.g., IndexedDB API), transport methods (e.g., asynchronous JavaScript and eXtensible Markup Language (AJAX), Fetch API, WebSockets API, and WebRTC API), asynchronous operations (e.g., Web Workers API), and control network requests (e.g., Service Workers API)) that provide more than enough functionality to implement a complete and complex web application (e.g., a web application providing a customer relationship management (CRM) system), there is no standard way to allow PWAs to make themselves accessible to others and listen for incoming connections.

Overview

Embodiments are described herein that allows users to install web applications into logical containers within their web browsers and manage those web applications. A web application installed into a logical container within a web browser may be referred to herein as a "containerized" web application. A containerized environment may allow multiple instances of an installable web application to be present within a single web browser, decouple applications from the data on which they operate, provide a reproducible cross-platform environment for application development and distribution, safeguard the web applications from interfering with each other, prevent the web applications from performing unwanted or potentially malicious operations on the computing device, provide a secure and unified interface to the underlying capabilities of the computing device that are not typically available to web applications, and/or provide a means for performing management operations, such as extracting web application data and taking snapshots of their runtime state. Embodiments may containerize web applications based on user-selected domain names. This is based on the observation that domain names and their associated origins form a basic unit of isolation of data structures inside web browsers. Since such isolation is the most basic and important property of containers, domain names are useful to use as a unit of containerization for installable web applications. Domain names can be pointed at any web server through the use of domain name system (DNS) records, and it is assumed that such domain names, when being used to containerize a web application, are pointed at a web server that is configured to serve a web page that includes a special container management code. The container management code may include code (also referred to as instructions) that can be executed by a web browser to perform various container-related operations such as installing and uninstalling web applications and/or extracting and restoring data/state associated with web applications. The container management code may also include code for providing a unified application programming interface (API) that gives web applications access to additional capabilities that are not available in standard environments provided by web browsers. The container management code may be controlled by and work in cooperation with a container management interface application. The container management interface application may be a PWA that provides users with a graphical user interface (GUI) through which they can install web applications into containers within their web browsers and manage those containerized web applications.

A web application executing in a web browser has no built-in means of listening for incoming connections, as there is no API provided by web browsers that would allow the web application to do so. More significantly, even if such API existed, it would most likely be limited to listening for connections on the local computer's Internet Protocol (IP) address and specified port.

Embodiments are described herein that provide a mechanism that allows a web application to listen for and respond to communications made to a user-selected domain name, which can be the same domain name that is being used to containerize the web application or even a different domain name. Embodiments provide a specialized relay server and accompanying software to facilitate communications over multiple protocols between a containerized web application registered under a user-selected domain name and clients that connect to that domain name.

With the use of a relay server and the ability of containerized web applications to be registered under user-selected domain names, the ability to verify identities and encrypt communications becomes of high importance.

Embodiments described herein allow for identity verification and end-to-end encryption of communications, for example, between a containerized web application and its clients when an untrusted relay server and/or network is relaying communications between them. Embodiments verify identities and provide end-to-end encryption of communications based on the placement of asymmetric-cryptography keys, or fingerprints of thereof, inside DNS records of the domain names associated with the claimed identities of entities involved in communications.

Embodiments described herein may use one or more of the containerization, communication, and verification/encryption techniques mentioned above to allow web applications to communicate, cooperate, and coordinate with each other (e.g., to work together as a part of a larger distributed system). Using the techniques described herein, web applications may be executed on computing devices owned/controlled by individual users but still be able to communicate and coordinate their state by passing messages between each other to create a user experience similar to the ones offered by centralized services.

For example, a cross-container intra-domain communication technique and a cross-container cross-domain communication technique are disclosed herein. With the cross-container intra-domain communication technique, web applications registered under the same domain name may be able to exchange data and communicate with each other via a relay server. In an embodiment, such web applications communicate with each other via the relay server to collectively decide which one of them should handle an incoming client's request (e.g., to perform load-balancing of incoming requests across multiple computing devices). The cross-container cross-domain communication method may provide a way for web applications registered under different domain names to exchange data via a relay server. Also, a distributed data synchronization technique is described herein that provides a way to disseminate a web application's data to a network of intended recipients such that the data remains available even when the web application is offline.

Web browsers and the technologies behind them form the core foundation of the current World Wide Web. With more modern features being added to web browsers, they can be used to spur the growth of a decentralized World Wide Web composed of self-hosted web applications. With embodiments disclosed herein, nothing more than a household computing device with a standards-compliant web browser may be needed to easily host and share a complete and independent web application and stay in control of its data. Various embodiments are now described in further detail with reference to the accompanying figures.

Detailed Embodiments

Figure 1:
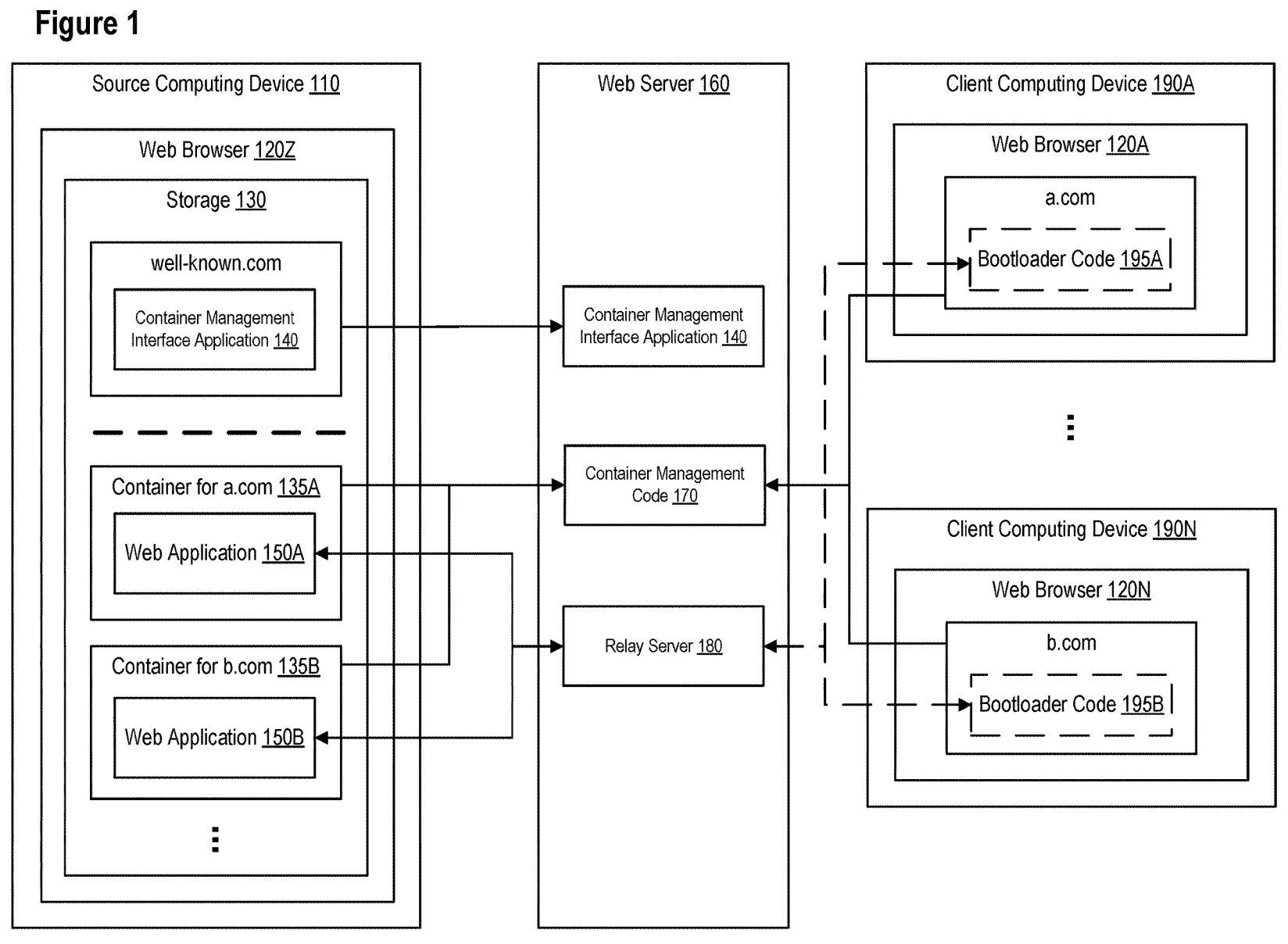

FIG. 1 is a diagram showing a system in which web applications can be installed into containers within a web browser of a source computing device and be made accessible to client web browsers of client computing devices, according to some embodiments.

As shown in the diagram, the system includes a source computing device 110, a web server 160, and client computing devices 190A-N. It should be noted that, while for purposes of illustration, a certain configuration of components is shown in the diagram, other embodiments may use a configuration that is different from what is shown in the diagram. Thus, the diagram should be regarded as being illustrative and not as limiting embodiments in a particular way.

The source computer device 110 may be a computing device (e.g., a laptop, desktop, or smartphone) that runs a web browser 120Z. The web browser 120Z may run as a standalone application or be embedded inside another application or environment. For example, the web browser 120Z may be embedded inside a desktop application through a framework such as Electron® or embedded inside a mobile application through a framework such as Cordova®. The web browser 120Z may have access to storage 130 that can be scoped to the domain name. As used herein, being "scoped to the domain name" refers to a logical separation that is made based on domain name or web origin (e.g., web browsers 120 may create logically separate storage for different domain names (e.g., "a.com" and "b.com") or different web origins (e.g., as defined by the combination of protocol, domain name and port, e.g., "https://a.com:443")). In an embodiment, the storage 130 includes multiple types of browser-based storage that are accessible via different means/APIs. For example, the storage 130 may include a Cache storage, an IndexedDB storage, and/or other browser-based storage mechanisms. As will be described in further detail herein, the web browser 120Z of the source computer device 110 may install and execute one or more web applications 150 within logical containers 135 that are associated with user-selected domain names. For example, as shown in the diagram, web application 150A is installed and executes in the container for "a.com" 135A (web application 150A is said to be "installed under" the "a.com" domain name) and web application 150B is installed and executes in the container for "b.com" 135B (web application 150B is said to be "installed under" the "b.com" domain name).

A web application may be composed of any number of files (e.g., multimedia files, webpages, scripts, styles, etc.) and be executable inside a standards-compliant web browser. For example, a simple web application may include a single Hypertext Markup Language (HTML) file that is configured to present a user with an editable text field and store the value entered by the user in the web browser's storage 130 (e.g., via a local Storage API). A more complex web application may, for example, include multiple files (e.g., JavaScript, HTML, CSS, WebAssembly, and/or multimedia files) that collectively implement a complete CRM system that provides multiple webpages and forms, uses complex business logic, stores data through storage mechanisms available in standards-compliant web browsers (e.g., via Cache API, IndexedDB API, localStorage API, and/or File System API), uses the web browser's Fetch API to communicate with other external services, and/or uses additional functionality provided by the runtime environment (e.g., to access capabilities of the underlying computing device, for example, through the Electron.js contextBridge, Cordova® plugins API, or the later-described container management code's API).

Similar to the source computing device 110, each of the client computing devices 190A-N may be a computing device that runs a web browser 120 but for the purpose of communicating with a web application executing in a web browser 120Z of the source computing device 110. For example, as shown in the diagram, client computing device 190A runs web browser 120A and client computing device 190N runs web browser 120N. As will be described in further detail herein, the web browser 120 of a client computing device 190 (also referred to herein as a "client web browser") may communicate with a containerized web application 150 executing in the web browser 120Z of the source computing device 110 via a relay server 180. In an embodiment, as will be described further herein, the web browsers 120 of the client computing devices 190 communicate with a containerized web application 150 based on executing bootloader code 195. For example, web browser 120A may execute bootloader code 195A to communicate with web application 150A via the relay server 180 and web browser 120N may execute bootloader code 195B to communicate with web application 150B via the relay server 180. In some embodiments, a computing device functions as both a source computing device 110 (e.g., that executes a containerized web application) and a client computing device 190 (e.g., that accesses a containerized web application).

The web server 160 may be implemented by one or more network devices that are communicatively coupled to the source computing device 110 and the client computing devices 190A-N over any suitable network(s) (e.g., the Internet). The web server 160 may run a container management interface application 140 that provides a graphical user interface (GUI) to the user of the source computing device 110. The container management interface application 140 allows the user (e.g., via the GUI) to install containerized web applications 150 in the web browser 120Z and manage those containerized web applications 150. Also, the web server 160 may host a container management code 170 that can be executed by the web browser 120Z of the source computing device 110 to install web applications into containers 135 within the web browser 120Z and to manage those containerized web applications 150. Also, the web server 160 may run a relay server 180 that facilitates communications between the containerized web applications 150 installed in the web browser 120Z of the source computing device 110 and the web browsers 120A-N of the client computing devices 190A-N.

In operation, the user of the source computing device 110 may use the web browser 120Z to access the container management interface application 140 at a known domain name ("well-known.com" in this example) that is pointed at the web server 160. In an embodiment, the container management interface application 140 is a PWA that gets installed in the storage 130 of the web browser 120Z, and upon subsequent visits, when possible, the stored version of the container management interface application 140 is executed in the web browser 120Z without the web browser 120Z having to communicate with the web server 160 (which allows the container management interface application 140 to be available to the user even when the source computing device 110 is offline).

As previously mentioned, the container management interface application 140 may provide a GUI that allows the user of the source computing device 110 to install web applications 150 into containers 135 within the web browser 120Z and manage those containerized web applications 150. For example, the GUI may allow the user to view all of the containers 135 and containerized web applications 150 that are currently present in the web browser 120Z, together with information about the domain names associated with the containers, and possibly other relevant information about those containers 135 and containerized web applications 150. The GUI may also allow the user to install new web applications 150 into containers 135 and perform various management functionalities related to containers 135 and installed containerized web applications 150 such as starting execution of a containerized web application, ending execution of a containerized web application, uninstalling a containerized web application, exporting data associated with a container, importing data associated with a container, taking a snapshot of a containerized web application, restoring a snapshot of a containerized web application, exporting an image of a container, importing an image of a container, and/or erasing the container.

FIG. 2 is a diagram showing a GUI of a container management interface application, according to some embodiments. As shown in the diagram, the GUI 200 displays the containers and containerized web applications that are currently present in the web browser 120Z and the domain names that those containers are associated with. In this example, the GUI 200 indicates that the "Photo Album" web application is separately installed inside the containers associated with the "winter2021.example" and "spring2022.example" domain names, and the "Company CRM" web application is installed inside the container associated with the "crm.company.example" domain name. The GUI 200 also indicates that the "Photo Album" web application installed inside the container associated with the "spring2022.example" domain name is currently being executed (it is "running"). The GUI 200 may provide a drop-down menu when the user clicks or otherwise activates the upside-down triangle icon associated with a container. For example, the diagram shows a drop-down menu that appears when the user clicks on the upside-down triangle icon associated with the "crm.company.example" container. The drop-down menu gives the user the option to start execution of the containerized web application that was installed into this container ("Start"), export data associated with the container ("Export Data"), import data associated with the container ("Import Data"), take a snapshot ("Take Snapshot"), restore a snapshot ("Restore Snapshot"), export an image of the container ("Download Container Image"), uninstall the web application from the container ("Uninstall Application"), and erase all browser-provided storage structures, including storage structures that hold application files, that are scoped to the domain name of the container ("Erase Container"). The GUI 200 also gives the user an option to install a new containerized web application ("Install a New Application" button).

The web browser 120Z of the source computing device 110 is initially devoid of any containerized web applications 150. The user of the source computing device 110 may use the container management interface application 140 to install a new web application 150 into a container 135 within the web browser 120Z. For example, the user may click on the "Install a New Application" button of the GUI 200. In response to the request to install a new application, the container management interface application 140 may display a list of web applications that can be installed in the web browser 120Z (e.g., in a form resembling an app store). In response to user input selecting a web application to install, the container management interface application 140 may ask the end user to enter/select the domain name under which the web application is to be installed. This domain name may serve to uniquely identify the container 135 into which the web application 150 will be installed and serve as a unit of encapsulation and a security boundary due to the same-origin polices enforced by web browsers 120. Once the user enters/selects the domain name under which the web application is to be installed, the container management interface application 140 may verify that the domain name points to the web server 160 that hosts a webpage that includes the container management code 170 (the webpage may include the container management code 170 itself or a link to the container management code 170 (e.g., through the use of a "<SCRIPT>" tag)). This may involve verifying that the address records or the canonical name records for the domain name in the DNS database are pointing to the web server 160 that hosts the webpage that includes the container management code 170. In an embodiment, the container management interface application 140 verifies that the user attempting to install the web application 150 is allowed to install or register web applications under the given domain name by, for example, looking at the user's claimed identity and the TXT records of the domain name in the DNS database, in which it expects to find an access control list definition that includes the user's claimed identity as one which is allowed to install or register web applications under that domain name. In an embodiment, the container management interface application 140 allows the user to provide a URL pointing to the collection of files associated with the web application and/or allows the user to directly upload the collection of files associated with the web application.

The container management interface application 140 may then open a new browser window, tab, or an embedded iframe that points to the entered/selected domain name with request parameters or data enclosed in the body of the request message indicating that web application installation is to be performed and indicating where the collection of files associated with the web application, the web application manifest file, and/or a complete image of the web application can be obtained. As an example, the request may take the form of the following URL:

crm.company.example/?appManifestUri=https://appstore.example/crm-app/manifest.json&action=install The URL points to the domain name under which the web application is to be installed ("crm.company.example"), indicates that web application installation is to be performed ("action=install"), and indicates where the manifest file for the web application can be obtained ("appManifestUri=https://appstore.example/crm-app/manifest.json"). In an embodiment, this request to install the web application includes a value proving that the request originated from the container management interface application 140, and not from a rouge third-party application.

It is assumed that the domain name under which the web application is to be installed points at the web server 160 (e.g., through the address or canonical name records in the DNS system) that hosts the webpage that includes the container management code 170.

The container management code 170 is code (e.g., JavaScript code) that is to be executed by the web browser 120Z of the source computing device 110 to install and manage containerized web applications 150. The container management code 170 may be executed by the web browser 120Z as a point-of-entry upon the webpage load. The operations triggered by the container management code 170 may depend on the parameters that are received through the URL, request body, or through a cross-window communication interface.

FIG. 3 is a diagram showing a container management code, according to some embodiments. As shown in the diagram, the container management code 170 includes code to install a containerized web application 310, code to execute a containerized web application 320, code to export data 330, code to import data 340, code to take a snapshot 350, code to restore a snapshot 360, code to export a container image 370, code to import a container image 380, code to uninstall web application 390, and code to erase a container 395. The source computing device 110 (and more specifically, the web browser 120Z of the source computing device 110) may execute the container management code 170 to perform container-related operations. For ease of description, code is described herein as performing certain operations. One having ordinary skill in the art will understand this to mean that the code includes instructions that when executed by a computing device causes the computing device 110 to perform those operations.

Install a Containerized Web Application

The code to install a web application 310 may perform the below operations.

1) The code 310 optionally verifies that the request came from a trusted source such as the container management interface application 140. This may be done, for example, by comparing the HTTP Referrer header value of the request against a list of white-listed domain names or with the use of a parameter whose value will otherwise validate that the source of the request is legitimate.

Verification that the request came from a trusted source may be performed before performing other operations as well (e.g., data export). For example, upon the initial installation of the containerized web application 150, a random value may be set as one of the parameters in the URL. This value may be remembered in the container management interface application 140 and in the container 135 for the containerized web application 150, and for any subsequent operations the container management code 170 detects that this value is included in the URL/parameters. If the container management code 170 does not detect the value, a "danger" screen may be presented to the user that requires user confirmation before the requested operations can be performed.

2) Using the received parameters encoded in the request URL or request body, the code 310 determines how to obtain the collection of files associated with a web application. The collection of files associated with the web application may be included in the request body, reside at a web address, be received through the use of postMessage or any other cross-window communication interface, or be uploaded directly to the webpage of the container management code 170 through a web form or other suitable means. A web application may consist of one or more files and an optional manifest file. The files may be compressed into a single archive and/or a manifest file can be used to specify the list of application files, and optionally, methods for obtaining them. The application manifest, if present, may also provide information about the name of the web application, an icon for the web application, the entry point for the web application execution (e.g., in the form of a reference to a JavaScript or HTML file), and/or other information about the web application.

3) The code 310 obtains the collection of files, and optionally, a copy of the container management code 170, and stores them in a storage location that is scoped to the domain name (e.g., using a Cache API, IndexedDB API, localStorage API, or similar storage API available to the web browser 120Z). The code 310 may also store the list of application files that were present in the collection of files and/or stored, to aid with other container management operations.

4) The code 310 registers a mechanism (e.g., a Service Worker) that is to serve one or more of the collection of files stored in the storage location upon request. The storage location that is used to store the collection of files associated with the web application (e.g., the Cache) is scoped to the domain name, which together with the container management code and the mechanism described above functions to logically containerize the web application based on domain name and provide an interface and environment for its execution, thereby forming a "containerized" web application.

5) Optionally, the code 310 reloads the webpage to start execution of the newly installed containerized web application 150.

By performing the above operations, a complete web application is copied to the context of a container 135 for the domain name as entered/selected by the user, and a mechanism (e.g., a Service Worker) is registered for serving the application files (the collection of files associated with the containerized web application 150) from storage 130, and optionally, for serving a copy of container management code 170.

In an embodiment a mechanism to serve one or more of the collection of files upon request is a Service Worker that is registered by the container management code 170 against an origin associated with the web application's container 135 domain name. The Service Worker intercepts navigation and resource requests, and serves a matching files of the containerized web application 150, from the storage location that is scoped to the domain name of the container 135 (e.g., Cache API, IndexedDB API, localStorage API) where they have been previously stored upon web application 150 installation. The Service Worker may also serve a copy of the container management code 170 (e.g., under a root path ("/")) allowing container management operations (e.g., executing containerized web application, exporting data), to work even when the web browser 120Z is in offline mode.

As an example, the container management code 170 may use code similar to the following pseudo-code to register a Service Worker:

await navigator.serviceWorker.register("/service-worker-script-file.js", {scope: '/'})

The Service Worker script file, as referenced in the code above, may be then served by the Web Server 160 under the /service-worker-script-file.js URL and may contain code similar to the following pseudo-code:

```
self.addEventListener('fetch', (event) ->
    event.respondWith(new Promise((resolve, reject) →
        appCache = await caches.open('application-files')
        url = new URL(event.request.url)
        response = await appCache.match(url.pathname)
        response ||= await fetch(event.request)
        resolve(response)
    ))
)
```

In a different embodiment a mechanism to serve one or more of the collection of files upon request is an API provided by the container management code 170. For example, the container management code 170 may register JavaScript function under a well-known name that the web application 150 will be able to use to access its files.

In yet another embodiment, a web application 150 is a Single-Page Application (SPA) that consists of a single file, and a mechanism to serve one or more of the collection of files is built-in and internal to the container management code 170 and allows such single file to be loaded/executed by the container management code 170.

In an embodiment, the container management interface application 140 is not used, and the user can install the web application from any webpage. For example, the web application creator's webpage may include an "Install" button and when the user clicks this button the webpage may ask the user to enter/select the domain name under which the web application is to be installed. Once the user enters/selects the domain name, the webpage may open a new tab or window, or redirect the user directly to the URL of such entered/selected domain name with instructions for the container management code 170 to install the web application.

In an embodiment, a reference to the application which is supposed to be installed under a domain name may be provided inside a record of the DNS database associated with the domain name. As an example, the record for the "spring2022.example" domain name may be configured as follows:

spring2022.example IN TXT app-id=photo-album

The container management code 170 may then query the DNS database for such record, and use its value to determine what application should be installed.

Optionally, multiple web applications 150 may be installed into single container 135. Such web applications may be installed into a storage location that is scoped to the domain name and additionally logically separated by the container management code 170 within the container (e.g., through the use of different database names in IndexedDB API, different cache names in Cache API, through the use of prefixes for keys of storage structures, or through any other suitable means). Such web applications when installed into a single container have common access to the data associated with the container, and may be, for example, a part of a data processing pipeline. In an embodiment, the code to install web application 310 receives an additional slot parameter, which is used by the container management code 170 to uniquely identify the storage location scoped to the domain name under which the web application files are stored. In an embodiment, the storage location is Cache, and the logical separation provided by the container management code 170 is done by using a slot parameter as Cache name, for example through a code similar to the following pseudo-code:

```
storageLocation = await caches.open((new
URLSearchParams(window.location.search)).get('slot'))
```

Execute a Containerized Web Application

Through the container management interface application 140, the user may be given the option to start the execution of any of the containerized web applications 150 installed in the user's web browser 120Z. The exercise of such option may cause the container management interface application 140 to open a new browser window, tab, or an embedded iframe that points at the web address of the entered/selected domain name with request parameters encoded in the request URL or request body indicating that application execution is to be performed.

Another way to trigger application execution is via the use of browser bookmarks. In such case, the user may bookmark the URL of the containerized web application 150 together with any parameters required for its execution, and trigger execution of the containerized web application directly from the browser bookmarks list.

Again, it is assumed here that the domain name under which the containerized web application 150 is installed is pointed at the web server 160 through the address or canonical name records in the DNS database, and that such web server 160 serves a webpage that includes the container management code 170 upon the receipt of such request.

Upon the webpage load, the container management code 170 determines which action is to be performed based on the information received through the request parameters encoded in the request URL or request body. Once it is determined that application execution is to be performed, the code to execute the containerized web application 320 starts execution of the containerized web application 150 by loading/evaluating a file from the collection of files associated with the containerized web application 150 (that was stored in storage 130 when the containerized web application was installed) that is designated as the entry point for the containerized web application 150 (e.g., loading an HTML file or loading and evaluating a JavaScript file that is indicated in the application manifest file as being the entry point for the containerized web application 150 or has a well-known name such as "index.html" or "index.js").

In an embodiment, when multiple web applications are installed inside a single container, a slot parameter may be received through the request parameters and used by the code 320 to determine the correct storage location from which the web application file designated as an entry point should be loaded. The slot parameter may be also used by the mechanism that is to serve one or more of the collection of files upon request to determine the storage location from which relevant web application files should be served.

The container management code 170 may persist in the memory of the web browser 120Z and provide an API to the executing containerized web application, allowing it to perform container-related operations such as, but not limited to, updating the containerized web application and uninstalling the containerized web application.

In an embodiment, the container management code 170 provides an API to the executing containerized web application 150, which would give it access to additional capabilities of the underlying computing device 110 if the web browser 120Z or its runtime environment has been adapted for it, for example, with the use of an Electron.js preloadScript and contextBridge, a specialized Cordova plugin, a dedicated browser extension or the like. Through it, the containerized web application 150 may be able to access the local file system of the underlying computing device 110, access connected peripherals, access local networks, invoke system calls, and/or perform other operations which are not typically available in the default web browser environment.

For example, a containerized web application 150 executing in a web browser 120Z embedded inside a desktop application through the Electon.js framework is able to call a "containerManagerAPIdeviceBridge.fs.read" method with a path of a file. This call may be relayed by the container management code 170 through the Electron.js contextBridge to the underlying Node.js process, which may present an additional dialog, allowing the user to decide if such operation can be performed, and if so, read the file at the provided path from the device file system, and return its contents to the containerized web application 150.

In an embodiment, the container management code 170, when given instructions, determines whether a containerized web application 150 is installed in the container 135, and if so, executes it. Otherwise, it attempts to connect to a web application at the domain name (e.g., to obtain and execute bootloader code 195 associated with the containerized web application 150, as will be further described herein). In such an embodiment, the user may skip the container management interface application 140 when attempting to execute the containerized web application 150, and instead enter the address of the containerized web application 150 directly into the address bar of the web browser 120Z or use browser bookmarks. Similarly, a user that attempts to connect to such containerized web application 150 may enter the same URL into their web browser 120 (e.g., client web browser 120A) to connect to the containerized web application 150.

Executing containerized web applications 150 in the manner described above or similar manner provides a safe and sandboxed execution environment. Standards-compliant web browsers treat different domain names as different origins for the needs of same-origin policy, and provide an isolated environment for code execution, with separate instances of underlying browser-provided data structures such as, for example, available through the Cache API, IndexedDB API and localStorage API.

Data Export and Import

As a containerized web application's data is logically associated with the domain name under which it is installed and isolated by the internal same-origin policies of the web browser 120, it is possible to enumerate such data and provide a means for downloading it by the user, and a means for uploading previously downloaded application data to a container 135 in order to restore the content of associated storage structures. Such data may include the complete application files, as they are available inside the container, giving an opportunity to export and import a complete containerized web application 150.

Through the container management interface application 140, the user may be given an option to export or import the data associated with a given container 135. The exercise of such option instructs the container management interface application 140 to open a browser window, tab, or an embedded iframe that points to the address of the domain name associated with the container 135, with request parameters encoded in the request URL or request body indicating that data export or data import is to be performed. When the data export option is chosen, and the container has a containerized web application installed, the container management interface application 140 may give the user the option to decide whether to include application files with the export or to just export other data associated with the container 135. In an embodiment, the containerized web application 150 itself provides the export and import functionality through the use of the container management code's 170 API.

The code to export data 330 may perform the below operations.

1) The code 330 gathers data from storage location(s) scoped to the domain name. This may be done by iterating through the various types of storage mechanisms available in the web browser 120Z and gathering all data that is stored in them, through the use of standard browser APIs. In particular, the gathered data may come from storage locations that are enumerable and accessible through, for example, the localStorage API, Cache API, IndexedDB API, WebSQL API, Web Cookies, and/or File System API. If application files are to be excluded from the export, the iterations may skip over any data that was stored during installation of the containerized web application 150.

2) Basing on parameters received in the request URL or request body, the code 330 saves the gathered data as one or more files, and optionally applies compression (e.g., to reduce file size).

3) The code 330 provides the one or more files to the user. Basing on parameters received in the request URL or request body, the code 330 may determine the method by which to provide the one or more files to the user. It may allow the user to download the files directly, send the files to a given web address, send the files over a WebSocket protocol to a relay server 180, or send the files via a postMessage or any other cross-window communication interface to a different browser window (e.g., to the browser window running the container management interface application 140).

In an embodiment, the exported files are transferred back to the container management interface application 140 through the use of the postMessage API, and stored in the storage scoped to the domain name (e.g., through the Cache API) under which the container management interface application 140 is installed. This allows the data exports to be listed, downloaded, and potentially restored through the use of the container management interface application 140.

The user may also be given an option to import data through the container management interface application 140. In such case, the user may pick one of the existing containers 135 into which the import should be performed, or pick a new domain name, not associated with any of the existing containers 135, which will act as an empty container for the data import. The user may then be asked to select one of the export files that were previously stored by the container management interface application 140, upload the file containing the exported data or provide a URL from which it can be downloaded.

The code to import data 340 may perform the below operations.

1) The code 340 accesses one or more files that contain the data to be imported. Basing on parameters received in the request URL or request body, the code 340 may determine the method by which to access the one or more files. The one or more files may reside at a web address, be received through the use of postMessage or any other cross-windows communication interface, be received through the WebSocket connection with a relay server 180, or be uploaded directly to the webpage that includes the container management code 170.

2) The code 340 stores the data included in the one or more files in the storage location(s) scoped to the domain name. This may be done by iterating through the various types of storage mechanisms available in the web browser 120Z, and if any of the files contain data associated with the given storage mechanism, replacing or merging the existing data with the data included in the one or more files.

Taking and Restoring a Snapshot

The concept of snapshotting the runtime state is well-known for virtualized environments. An analogous mechanism is described herein that allows taking snapshots of the data and the current runtime state of a containerized web application 150, and to restore it if and when needed.

Through the container management interface application 140, the user is given the option to take a snapshot of a given running containerized web application 150 or restore one of previously taken snapshots. The exercise of the "take snapshot" option instructs the container management interface application 140 to send a command through the postMessage or other cross-window communication interface to the browser window executing the containerized web application 150 whose snapshot is to be taken, which will be received by the relevant container management code 170 loaded in that browser window.

In an embodiment, the containerized web application 150 itself provides the taking and restoring snapshot functionality through the use of the container management code's 170 API.

The code to take a snapshot 350 may perform the below operations.

1) Upon receiving a request to take a snapshot, the code 350 sends a signal to the containerized web application 150 to pause execution. The code 350 may call a callback function registered by the containerized web application 150, which will signal to the containerized web application 150 that the snapshot process has begun, giving the containerized web application 150 an opportunity to pause execution so that its state does not get further altered. As an example, the containerized web application 150 may use code similar to the following pseudo-code to register a callback function:

```
containerManagerAPI.onSnapshot=async function( ){
    . . . }
``` or for example:

```
window.addEventListener('snapshot:start',function(
    ){ . . . }
```

2) Once the callback function or a promise returned by it completes, the container management code 170 may take a snapshot of the containerized web application 150. This may involve gathering and saving the data associated with the containerized web application 150 as done in the data export phase described above (e.g., which may involve iterating through various types of storage mechanisms and gathering data from each of them, when applicable). Once the gathering of initial data is complete, the code 350 may serialize and save the value of global variables whose names were specified in the containerized web application's manifest file.

3) The code 350 may also serialize and save the return value of the callback function or a promise returned by it, giving the containerized web application 150 an opportunity to gather any additional state data that it wishes to include in the snapshot.

4) Once the snapshot has been taken, the code 350 may send a signal to the containerized web application 150 to resume execution. This may be done by the code 350 calling a different callback function registered by the containerized web application 150, which will signal to it that the snapshot process has completed. The invocation of such callback function may also signal to the containerized web application 150 that all data has been already gathered by the container management code 170, and that it can now resume its normal operations.

In an embodiment, the snapshot is transferred back to the container management interface application 140 through the use of cross-window communication interface (e.g., the postMessage API), and stored in the storage scoped to the domain name (e.g., through the Cache API) under which container management interface application 140 is installed. This allows the snapshot to be listed, downloaded, and potentially restored through the use of the container management interface application 140.

A snapshot of a containerized web application 150 may be restored using a similar approach as the data import process, with the additional operations of restoring the state of global variables saved in the snapshot, and invoking an application-provided callback function, with the data, a promise of data, or a callback function returning the data that was previously returned by a callback function invoked during the snapshot creation, and saved in the snapshot file.

Through the container management interface application 140, for the selected containerized web application 150, the user is given the option to restore one of previously taken snapshots or to upload a snapshot to be restored. The exercise of such option instructs the container management interface application 140 to open a new browser window, tab, or an embedded iframe that points at the web address of the selected domain name, with request parameters encoded in the request URL or request body indicating that snapshot restoration is to be performed, and indicating or including as part of the request the source of the snapshot file. Alternatively, if containerized web application 150 is already running, a postMessage or any other cross-window communication interface may be used to indicate that snapshot restoration is to be performed and to indicate the source of snapshot file or to directly transfer the snapshot file to the container management code 170. The container management code 170 determines the action to be performed through the information received from request parameters encoded in the request URL, request body, or as received from the cross-window communication interface.

The code to restore a snapshot 360 may perform the below operations.

1) Upon receiving a request to restore a snapshot, the code 360 sends a signal to the containerized web application 150 to pause execution (if the containerized web application 150 is currently running).

2) The code 360 updates the runtime state of the containerized web application 150 to match the runtime state included in the snapshot. This may involve similar operations as the ones for performing data import described above, and additionally restoring the values of global variables, by reading their names and deserializing their values from the snapshot. The code 360 may then initialize a well-known variable (e.g., containerScript.snapshotData) with the data as it was returned by the application callback function during snapshot creation.

In an embodiment, the global variable names, which values are stored by code 350 and then restored by code 360, may be given in a nested syntax (e.g., "myGlobalObject.aNamespace.variableName"). In such case, the container management code 170 may first look for the object assigned to the property "myGlobalObject" of the JavaScript global window object, then for the object assigned to the property "aNamespace" of the "myGlobalObject", and then for the object assigned to the property "variableName" of the "aNamespace" object. If at any stage the value of the given property name is undefined, the container management code 170 may initialize it with an empty object (e.g., "{ }").

3) Once the snapshot has been restored, the code 360 may start execution of the containerized web application 150 or send a signal to the containerized web application 150 to resume execution (if execution of the containerized web application 150 was previously paused), which may include the data as it was returned by the application callback function during snapshot creation. The containerized web application 150 may then receive such signal or check the presence of the well-known variable to recognize that it has been restored from the snapshot, and process its value to restore the containerized web application's internal runtime state.

Exporting and Importing a Container Image

Given mechanisms to export/import data associated with a container 135 and take/restore a snapshot of a containerized web application 150, as described above, embodiments may provide a mechanism to export and import a complete image of a container 135 that includes the application files and data associated with the containerized web application 150, together with any number of data export files and snapshot files.

Through the container management interface application 140, the user is given the option to export a complete image of a container 135. When the image export option is chosen, the container management interface application 140 may give the user the option to decide which export files or snapshot files, that were previously stored by the container management interface application 140, should be included in the image.

The code to export a container image 370 may perform the below operations.

1) The code 370 performs a data export that may include application files (if containerized web application is installed and not running) or takes a snapshot (if containerized web application is installed and running), as previously described.

2) The code 370 generates a container image that includes the data gathered in the previous step, together with any data export files and snapshot files, as selected by the user, that were previously stored by the container management interface application 140. The container image may be generated as single compressed archive file with a pre-defined structure.

3) The code 370 provides the container image to the user.

The user may also be given an option to import a container image through the container management interface application 140. In such case, the user may pick one of the existing containers 135 into which the import should be performed, or pick a new domain name, not associated with any of the existing containers 135, which will act as an empty container for the import. The user may then be asked to upload the file containing the exported container image or provide a URL from which it can be downloaded.

The code to import a container image 380 may perform the below operations.

1) The code 380 accesses the container image.

2) The code 380 stores the data included in the container image (e.g., by performing operations that are similar to the "data import" or "restoring a snapshot" operations described above).

3) The code 380 stores any additional data export files and snapshot files included in the container image in the local storage scoped to the domain name (e.g., through the Cache API) under which the container management interface application 140 is installed.

For example, once the container import option is selected, the container management interface application 140 may unpack the received archive file and restore the application files and data associated with the containerized web application 150. It may then store the data of any other data exports and/or snapshots that were present in the received archive file and make them available in the user interface to be restored, if and when needed.

Uninstalling a Web Application

During installation of a web application 150 into container 135, a list of installed application files and/or a reference to the manifest file may be stored by the container management code 170. The list of files may be then read and used by the container management code 170 to selectively remove the previously stored application files from the storage location, allowing the web application 150 to be uninstalled from the container 135 while leaving its data in the relevant data storage structures associated with the container 135. This allows decoupling of application from its data. For example, a different web application 150 may be later installed into the same container 135, which will gain access to such data.

Through the container management interface application 140, the user is given the option to uninstall web application 150 from its container 135. The exercise of such option instructs the container management interface application 140 to open a browser window, tab, or an embedded iframe that points to the address of the domain name associated with the container 135, with request parameters encoded in the request URL or request body indicating that web application uninstallation is to be performed.

The code to uninstall web application 390 may perform the below operations.

1) The code 390 retrieves a list of application files and/or an application manifest file from a well-known storage location, under which it has been stored upon the web application installation.

2) The code 390 iterates over the list of application files, removing each of them from the storage location under which it has been stored.

Erasing a Container

Various storage mechanisms and their related APIs provided by the standards-compliant browser can be iterated over, and their content can be removed. This allows a complete erasure of data and application files stored within container.

Through the container management interface application 140, the user is given the option to erase the container 135. The exercise of such option instructs the container management interface application 140 to open a browser window, tab, or an embedded iframe that points to the address of the domain name associated with the container 135, with request parameters encoded in the request URL or request body indicating that container erasure is to be performed.

The code to erase container 395 may perform the below operations.

1) The code 395 iterates over a predefined list of various storage mechanisms that may be available in a standards-compliant web browser. For each storage mechanism the code 395 uses the related API to request erasure of data stored within it.

Relay Server

The relay server 180 may facilitate communications between containerized web applications 150 and clients who connect to it (e.g., client web browsers 120A and 120B). Without such facilitation, containerized web applications 150 would have no means of listening for, and handling incoming connections from clients. For purposes of illustration, various embodiments are primarily described herein in the context of containerized web applications 150. However, it should be understood that the same/similar techniques and principles described herein (e.g., for facilitating communications via a relay server and/or identity verification and encryption) can be applied in the context of non-containerized web applications.

A containerized web application 159 may be registered with the relay server 180 under user-selected domain names. For example, a photo album web application may be installed by the user into the container 135 associated with the domain name "photos.joesmith.com", and registered under the same or different domain name(s). Once registered under a domain name, client web browsers 120 may connect to the containerized web application 150 via various means and protocols at the domain name. For example, when the photo album web application is registered under the "photos.joesmith.example" domain name, users may access the containerized web application 150 by pointing a standards-compliant web browser at the URL of "https://photos.joesmith.example" and also, for example, add new photos to the photo album by sending emails with the new photos to be added (or a reference/link to those photos) to the "inbox@photos.joesmith.example" email address.

It is assumed that the domain names under which a containerized web application 150 is registered (to make the containerized web application available for incoming connections) is pointed at the relay server 180 with the use of DNS records stored in a DNS database. For example, a domain name can be pointed at the relay server 180 using an A record, AAAA record, CNAME record, TXT record (e.g., "a.com IN TXT relay-server=relay.example"), or MX record (for email). In an embodiment, the relay server 180 is also configured to serve the webpage that includes the container management code 170 such that the domain name under which the containerized web application 150 is installed is the same as the domain name under which the containerized web application is registered with the relay server 180 (the domain name at which the containerized web application 150 listens for incoming connections).

To provide high availability a domain name may be pointed at multiple relay servers (e.g., through the use of multiple A records) or various other routing and load-balancing mechanisms may be used (e.g., Latency Based Routing, Geo DNS, Geoproximity, or Weighted Round Robin). It is then assumed that the potentially different relay servers that containerized web application 150 and client web browsers 120 may have connected to, communicate or redirect traffic to each other, and may provide interface equivalent to the interface that would be provided if containerized web application 150 and client web browsers 120 connected to the same relay server.

Various mechanisms that a containerized web application 150 and a relay server 180 may use to make the containerized web application accessible to clients are described below. What these mechanisms have in common is that the containerized web application 150 is using a bidirectional communication connection (e.g., WebSocket or WebTransport connection) established with the relay server 180 of the domain name that the containerized web application 150 is to be registered under. The relay server 180 is responsible for receiving communications from clients, transforming them, and relaying them back-and-forth to the containerized web application 150 over the bidirectional communication connection.

Figure 4:
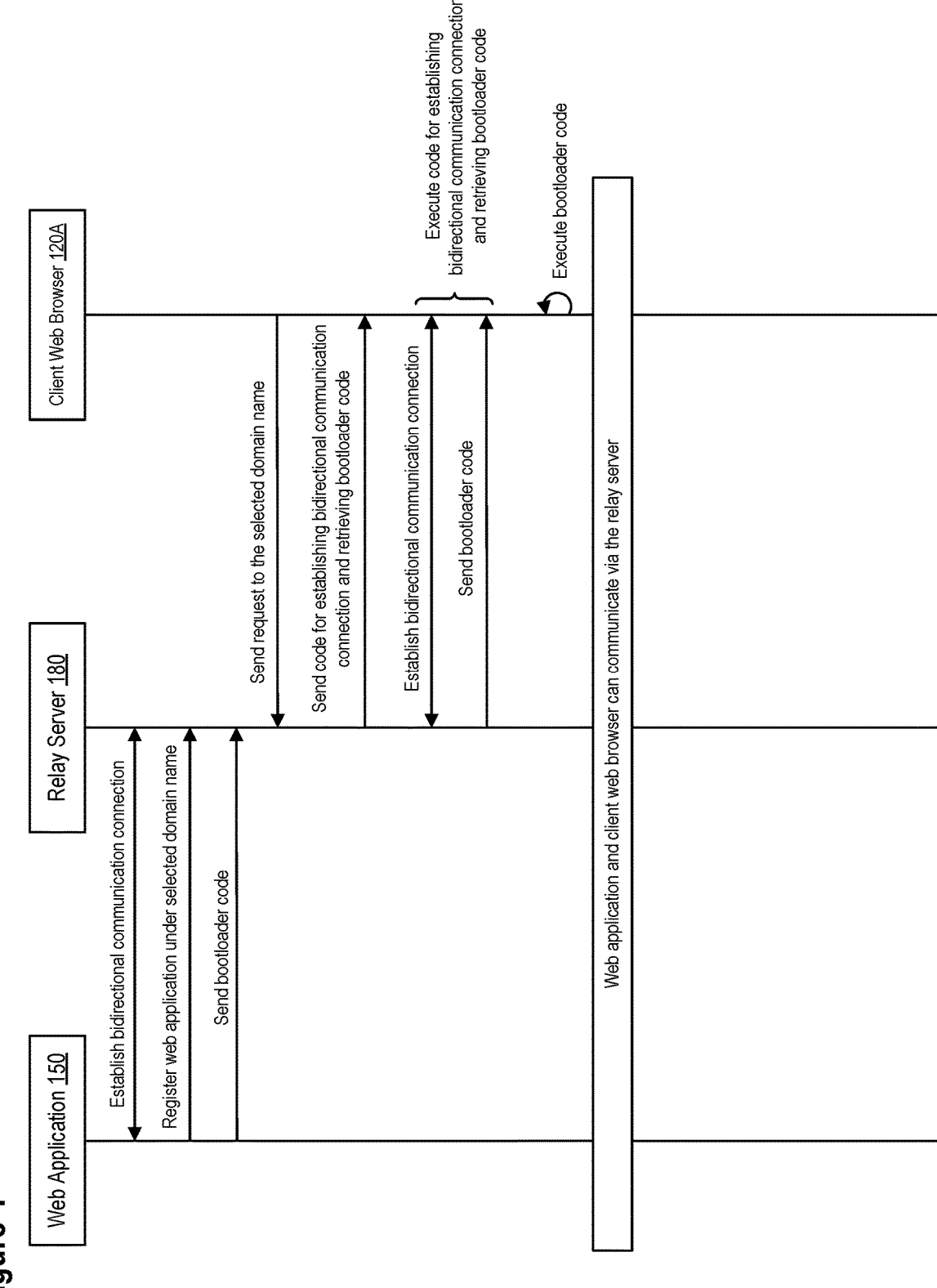
FIG. 4 is a diagram showing operations for providing communications between a web application and a client web browser via a relay server using a bootloader code, according to some embodiments.

FIG. 4 is a diagram showing operations for providing communications between a web application and a client web browser via a relay server using a bootloader code, according to some embodiments.

As shown in the diagram, the web application 150 establishes a bidirectional communication connection with the relay server 180. The web application 150 then registers itself under a selected domain name. The web application 150 then sends bootloader code 195 associated with the web application 150 to the relay server 180. The bootloader code is code (e.g., JavaScript code) that is registered by the web application 150 on the relay server 180 under the specified domain name. The bootloader code 195 may be specific to each web application. In general, its role is to load all needed resources (either through the use of the bidirectional communication connection with the containerized web application 150 or from external sources), bootstrap the web application's 150 environment and hand off the execution to one of the loaded JavaScript or HTML files. In some cases, if the web application 150 is offline, but the bootloader code is registered for the given domain name on the relay server 180, then the bootloader code may present a friendly error page to any clients that attempt to connect to the web application 150.

As an example, the containerized web application 150 may invoke code that is similar to the following pseudo-code:

```
WebAppManager.publish('mydomain.example', [function(clientConnec-
tion)
{ ... }, "function(serverConnection){ ... }"]);
```

Upon the execution of such code, a WebSocket connection is open with the server 180 for the domain name "mydomain.example", which is assumed to be a relay server 180. Through this WebSocket connection, it will be signaled that the containerized web application 150 wants to listen for incoming connections at the domain name "mydomain.example", and the bootloader code is "'function(serverConnection){ ... }'".

Subsequently, the client web browser 120A sends a request to the selected domain name, which is pointed at the relay server 180.

Responsive to receiving the request, the relay server 180 sends code to the client web browser 120A for establishing a bidirectional communication connection and retrieving bootloader code.

The client web browser 120A then executes the received code, which results in the client web browser 120A establishing a bidirectional communication connection with the relay server 180 and receiving bootloader code 195 from the relay server 180. The client web browser 120A may then execute the bootloader code 195. The bootloader code 195 executed in the client web browser 120A may receive access to an open bidirectional communication connection with the web application 150, and may be able to use it to load all required resources and communicate with the web application 150 via the relay server 180.

For example, when the relay server 180 receives a HTTP GET request from a client web browser 120A at the domain name "mydomain.example", the relay server 180 may return a HTML page with embedded JavaScript code that when executed by the client web browser 120A causes the client web browser 120A to open a WebSocket connection with the relay server 180 and download and execute the bootloader code. The bootloader code may receive a reference to the WebSocket connection as an argument, and will be able to communicate with the web application 150, which will also receive a reference to the Web Socket connection as an argument to the "function(clientConnection){ ... }" callback function, that it has previously registered.

As a result, the web application 150 and the client web browser 120A may communicate via the relay server 180 (over two bidirectional communication connections). It is then up to the containerized web application 150 and the bootloader code to decide how to use the connection.

In an embodiment, a web page returned by relay server 180 upon receipt of a HTTP GET request from a client web browser 120A includes the container management code 170. The container management code 170 determines whether a containerized web application 150 is installed in the container 135, and if so, executes it. Otherwise, it attempts to establish a bidirectional communication connection with the relay server 180 and retrieve bootloader code 195.

In an embodiment, the selected domain name is pointed at a web server (that is separate from the relay server 180) that serves a webpage that includes the code for establishing a bidirectional communication connection and retrieving bootloader code. This code may include the address of the relay server 180 or determine the address of the relay server 180, for example, based on looking up a TXT record associated with the selected domain name in the DNS database. As an example, the record for the "crm.company.example" domain name in the DNS database may be configured as follows:

```
crm.company.example IN CNAME static-website.example
crm.company.example IN TXT relay-server=relay.example
```

Figure 5A:
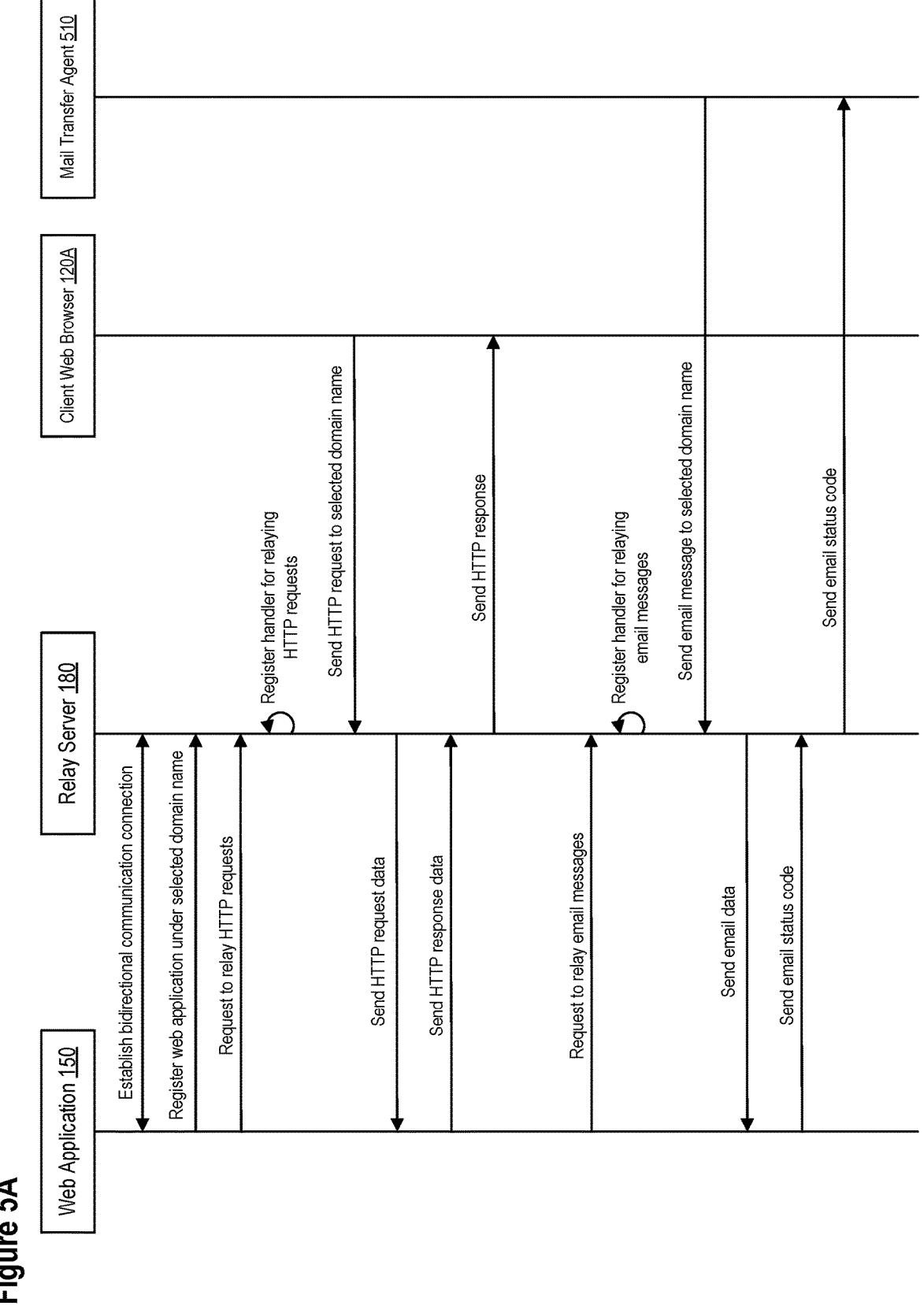
FIG. 5A is a diagram showing operations for providing an HTTP protocol relay and an email relay, according to some embodiments.

FIG. 5A is a diagram showing operations for providing an HTTP protocol relay and an email relay, according to some embodiments.

As shown in the diagram, the web application 150 establishes a bidirectional communication connection with the relay server 180. The web application 150 then registers itself under a selected domain name.

The web application 150 may then send a request to the relay server 180 to relay HTTP requests. Responsive to receiving the request, the relay server 180 may register a handler for relaying HTTP requests to the web application 150. The handler may configured to handle relaying of standard HTTP request and/or HTTPS requests.

Subsequently, the client web browser 120A may send an HTTP request to the selected domain name. Since the selected domain name points at the relay server 180, this HTTP request is sent to the relay server 180.

Responsive to receiving the HTTP request, the relay server 180 sends the HTTP request data to the web application 150. The HTTP request data may include the plain or transformed headers and body of the HTTP request.

Responsive to receiving the HTTP request data, the web application 150 may generate and send HTTP response data to the relay server 180.

The relay server 180 may then send a HTTP response (that includes the HTTP response data) to the client web browser 120A.

In this way, the relay server 180 "relays" HTTP-related communications between the client web browser 120A and the web application 150.

For example, the web application will be able to invoke code that is similar to the following pseudo-code:

```
WebAppManager.onHTTP('GET', 'mydomain.example/a-path', async
function(request, response){ ... });
```

Upon the execution of such code, a WebSocket connection is opened with the server for the domain name 'mydomain.example", which is assumed to be a relay server 180. Through this WebSocket connection, it will be then signaled to the relay server 180 that the containerized web application 150 wants to listen for incoming HTTP connections on the "mydomain.example" domain name, that use the HTTP GET method, and are for the "/a-path" path. Once the relay server 180 receives a matching HTTP request, it will forward it to the containerized web application 150 that has registered for it through the relevant WebSocket connection. The callback function "async function(request, response) { . . . }" of the containerized web application 150 will receive the request data through one of its arguments, and will receive the response object as another argument. It will be then able to invoke methods on the response object that will send the headers and body of the HTTP response to the relay server 180 through the WebSocket connection. For example, code similar to the following pseudo-code may be used:

```
WebAppManager.onHTTP('GET', 'mydomain.example/a-path', async
function(request, response){
  new Promise( function(resolve, reject) {
    response.writeStatus('200')
    response.writeHeader('Content-Type', 'text/plain')
    response.writeBody('Hello world!')
    response.end( )
    resolve( )
  }
})
```

The relay server 180, upon or during the receipt of such response, may respond to the original HTTP request with the received data.

Also, as shown in the diagram, the web application 150 may send a request to the relay server 180 to relay email messages. Responsive to receiving the request, the relay server 180 may register a handler for relaying email messages to the web application 150.

Subsequently, a mail transfer agent 510 may send an email message to the selected domain name. Since the selected domain name points at the relay server 180, this email message is sent to the relay server 180.

Responsive to receiving the email message, the relay server 180 sends email data of the email message to the web application 150.

Responsive to receiving the email data, the web application 150 may process the email data and generate and send an email status code to the relay server 180.

The relay server 180 may then send the email status code to the mail transfer agent 510.

In this way, the relay server 180 "relays" email-related communications between the mail transfer agent 510 and the web application 150.

For example, the web application 150 may invoke code that is similar to the following pseudo-code:
WebAppManager.onEmail('mydomain.example', async function(emailData){ . . . });

Upon the execution of such code, a WebSocket connection is opened with the server for the domain name "mydomain.example", which is assumed to be a relay server 180. Through this WebSocket connection, it will then be signaled to the relay server 180 that the web application 150 wants to receive emails at the "mydomain.example" domain name. Once the relay server 180 receives an incoming email, it will look at "RCPT TO" field of the email's envelope, and try to match the domain name of the intended email recipient with the domain names of registered web applications. If a match is found, it may parse the email data and deliver it to the web application 150 that has registered for it, over the relevant WebSocket connection. The callback function "async function(emailData){ . . . }" of the web application 150 may receive the email data, and send a status code back to the relay server 180 indicating whether such email data was accepted, rejected, bounced, or delivery should be retried later. The relay server 180, upon receipt of such response, may respond to the original email with the appropriate simple mail transfer protocol (SMTP) status code as designated by the response received from the web application 150.

Figure 5B:
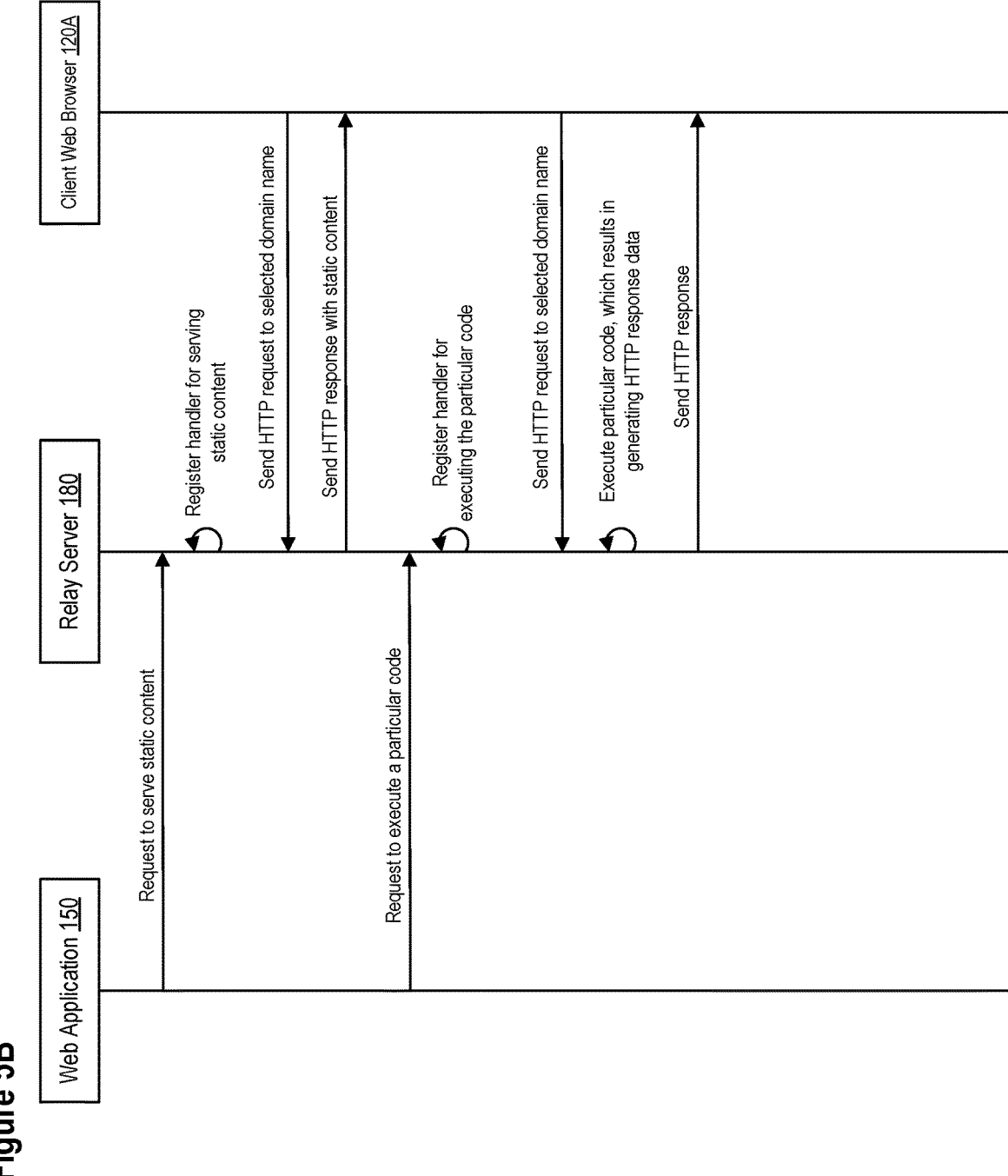
FIG. 5B is a diagram showing operations for serving static assets and providing offline operations, according to some embodiments.

FIG. 5B is a diagram showing operations for serving static assets and providing offline operations, according to some embodiments.

As shown in the diagram, the web application 150 may send a request to the relay server 180 to serve static content. Responsive to receiving the request, the relay server 180 may register a handler for serving the static content.

Subsequently, the client web browser 120A may send an HTTP request to the selected domain name. Since the selected domain name points at the relay server 180, this HTTP request is sent to the relay server 180.

Responsive to receiving the HTTP request, the relay server 180 sends an HTTP response to the client web browser 120A that includes the static content.

In this way, the relay server 180 may serve static content on behalf of the web application 150 even when the web application goes offline or loses connection to the relay server 180.

For example, the web application may invoke code that is similar to the following pseudo-code:

```
WebAppManager.registerAsset(
    'mydomain.example/a-path',
    {'Content-Type':'text/html'},
    "Hello world!"
);
```

Upon the execution of such code, a WebSocket connection is opened with the server for the domain name "mydomain.example", which is assumed to be a relay server 180. Through this WebSocket connection, it will then be signaled to the relay server 180 that when the relay server 180 receives a HTTP GET request for the "mydomain.example/a-path" URL, it should respond with a "HTTP 200 OK" status, a "Content-Type": "text/html" header, and a "Hello world!" body, without getting the web application 150 involved in the processing of the HTTP GET request.

Also, as shown in the diagram, the web application 150 may send a request to the relay server 180 to execute a particular code.

Responsive to receiving the request, the relay server 180 may register a handler for executing the particular code.

Subsequently, the client web browser 120A may send an HTTP request to the selected domain name. Since the selected domain name points at the relay server 180, this HTTP request is sent to the relay server 180.

Responsive to receiving the HTTP request, the relay server 180 may execute the particular code, which results in generating HTTP response data. The specifics on how the JavaScript code is executed on the relay server 180 or passed by the relay server 180 to another server for execution may depend on the implementation. Any suitable mechanism to perform safe and sandboxed server-side execution of the provided code may be used (e.g., V8 JavaScript interpreter engine).

The relay server 180 may then send an HTTP response (including the HTTP response data generated as a result of executing the particular code) to the client web browser 120A.

In this way, the relay server 180 may serve dynamic content on behalf of the containerized web application 150 even when the web application goes offline or loses connection to the relay server 180.

For example, the web application may invoke code that is similar to the following pseudo-code:

```
WebAppManager.registerHandler(
    'GET',
    'mydomain.example/a-path',
    "async function(request, response){ ... }"
);
```

Upon the execution of such code, a WebSocket connection is opened with the server for "mydomain.example", which is assumed to be a relay server 180. Through this Web Socket connection, it will then be signaled to the relay server 180 that when the relay server 180 receives a HTTP GET request for the "mydomain.example/a-path" URL, it should execute the provided callback code "async function(request, response){ . . . }" with the request data provided as a first argument, and expect it to invoke methods on the response object that will directly generate the HTTP response data, without getting the application involved in processing of the HTTP GET request.

Identity Verification and Encryption

One of the hurdles in decentralization is the lack of inherent ability to verify the identity of involved entities and provide a secure communication channel that is immune to man-in-the-middle attacks. Identity verification is an important component, as once it is provided, end-to-end encryption may be achieved through the exchange of public keys of asymmetric ciphers or by use of any other key exchange algorithm such as Diffie-Hellman. In the HTTPS protocol, such identity verification is based on a pre-installed set of "root" certificates, which allow chain-of-trust verification of certificates issued for individual domain names at the time when they are presented by the web server serving the request for the given domain name.

With embodiments disclosed herein, where containerized web applications 150 can be registered under user-selected domain names, the security model of HTTPS protocol loses merit, as private keys of secure socket layer (SSL) certificates for domain names under which containerized web applications 150 are registered have to be available to the relay server 180.

Embodiments use an alternative approach that allow for verifying the claimed identities of entities as they connect to the relay server 180, and that will allow entities involved in communications with each other to independently verify each other's identities, even when a potentially rouge relay server 180 and/or network is relaying communications between them. The identity verification mechanism can be extended to provide containerized web applications 150 and their clients with the capability of performing secure end-to-end encrypted communications.

In an embodiment, users and web applications are identified by identity strings. An identity string may be a text that has a set structure, and includes one or more domain names. For example, an identity string may be as follows: "john@acmecompany.com:johnny@login.microsoft.com: auth.webappidentity.com".

The last, or any otherwise designated domain name specified in the identity string has a TXT or similar record in the DNS system that contains the public key, or a fingerprint thereof, as used in asymmetric key cryptography. For example, a TXT record may be as follows:

```
auth.webappidentity.com IN TXT identity-verification-
    key=00:11:22:33:44:55:66:77:88:99:aa:bb:cc:dd:ee:ff
```

Such domain name acts as an identity provider for the given identity string, and is referred to herein as an "identity provider domain".

Web applications 150 may have their own identity strings embedded inside their code (e.g., associated with the domain name of their developer), may receive identity strings from their users (e.g., identity strings identifying users, or associated with the domain name under which the web application is published), and/or they may receive identity strings from any external source (e.g., from the container management interface application 140 or from external service), The web applications may then claim any or all of these strings when communicating with the relay server 180 and/or with another web application 150. Cryptographic secrets that are needed by the web application 150 to prove the claimed identity strings may be also received through any of the means described above.

When connecting to the relay server 180, a web application 150 may refrain from claiming any identity string to remain anonymous, or present a structured access token, such as for example a JSON web token (JWT), which includes the identity string, and that is signed either directly with the private key associated with the public key as visible in the DNS system for the identity provider's domain, or the structured access token may include certificates or similar structure, forming a chain-of-trust, for which the public key or fingerprint of thereof of the trust anchor is present in the DNS database for the identity provider domain. If only a fingerprint of the public key is visible in the DNS system, the structured access token may also include the full public key that matches the fingerprint.

The relay server 180, upon receipt of such structured access token, may look up the identity provider's domain as specified by the identity string, and query its records in the DNS database to find the public key or its fingerprint. It may then validate the access token's signature with it. If correct, it will assume that the claimed identity of the connecting web application is valid.

Figure 6:
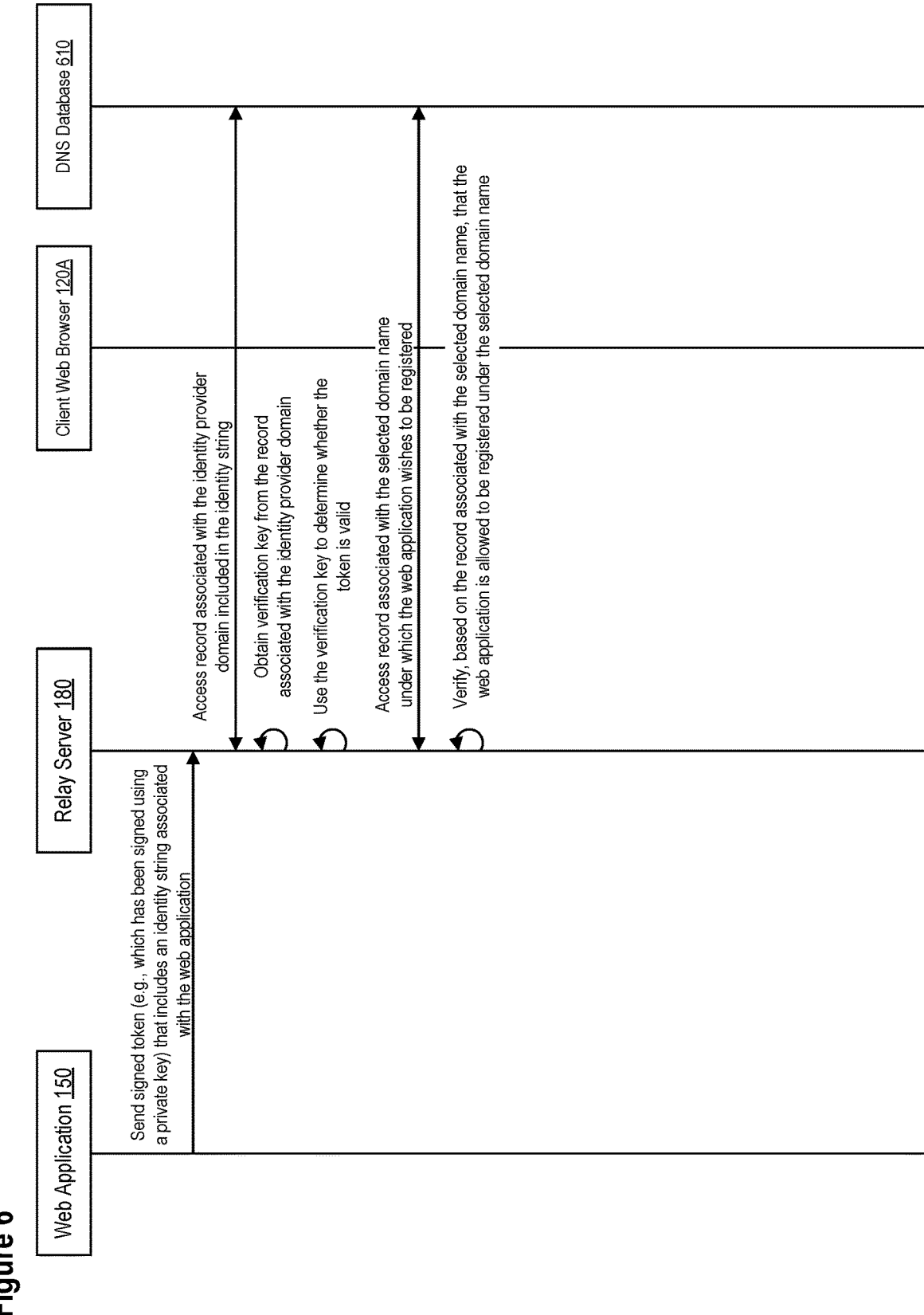
FIG. 6 is a diagram showing operations for verifying the identity string claimed by a web application and the web application's ability to be registered under a given domain name, according to some embodiments.

FIG. 6 is a diagram showing operations for verifying the identity string claimed by a web application and the web application's ability to be registered under a given domain name, according to some embodiments.

As shown in the diagram, the web application 150 sends a signed token that includes an identity string associated with the web application.

Responsive to receiving the signed token, the relay server 180 accesses a record associated with the identity provider domain included in the identity string from the DNS database 610.

The relay server 180 obtains a verification key from the record associated with the identity provider domain and uses the verification key to determine whether the token is valid, by validating its signature against the verification key. In an embodiment, the verification key may be a public key, or a fingerprint of the public key.

In an embodiment, the relay server 180 accesses a record associated with the selected domain name under which the web application wishes to be registered. The relay server 180 then verifies, based on the record associated with the selected domain name, that the web application is allowed to be registered under the selected domain name.

Using this technique, any entity, including the relay server 180, web application 150, and its clients 120, may independently verify that the web application 150 which is claiming a given identity is allowed to be registered under a given domain name by checking the DNS record associated with such domain, and expecting to find a reference to the claimed identity. For example, a DNS record may be as follows:

a.com. 60 IN TXT "1=*@company.example"

In such case, for the "a.com" domain name, there is a TXT record, which includes one or more "1= . . . " parts, where "1" stands for "listen", and after it there is a reference to the identity string. In this example, according to the TXT record, a web application 150 which is claiming the identity string "john@company.example" or any other identity string ending with "@company.example" may be able to be registered under the "a.com" domain name. Such verification is important for the relay server 180, so that it knows that the user is actually allowed to register web applications 150 under the given domain name.

This may also be useful for achieving end-to-end encryption, as it allows the client to independently verify that the web application 150 that it is connecting to (in particular, the identity string claimed by the web application 150) was actually allowed by the domain name owner to be registered under the domain name. This may prevent the relay server 180 from performing an attack where it silently swaps the web application 150 listening on the given domain name with some other web application 150 having a different identity.

Figure 7:
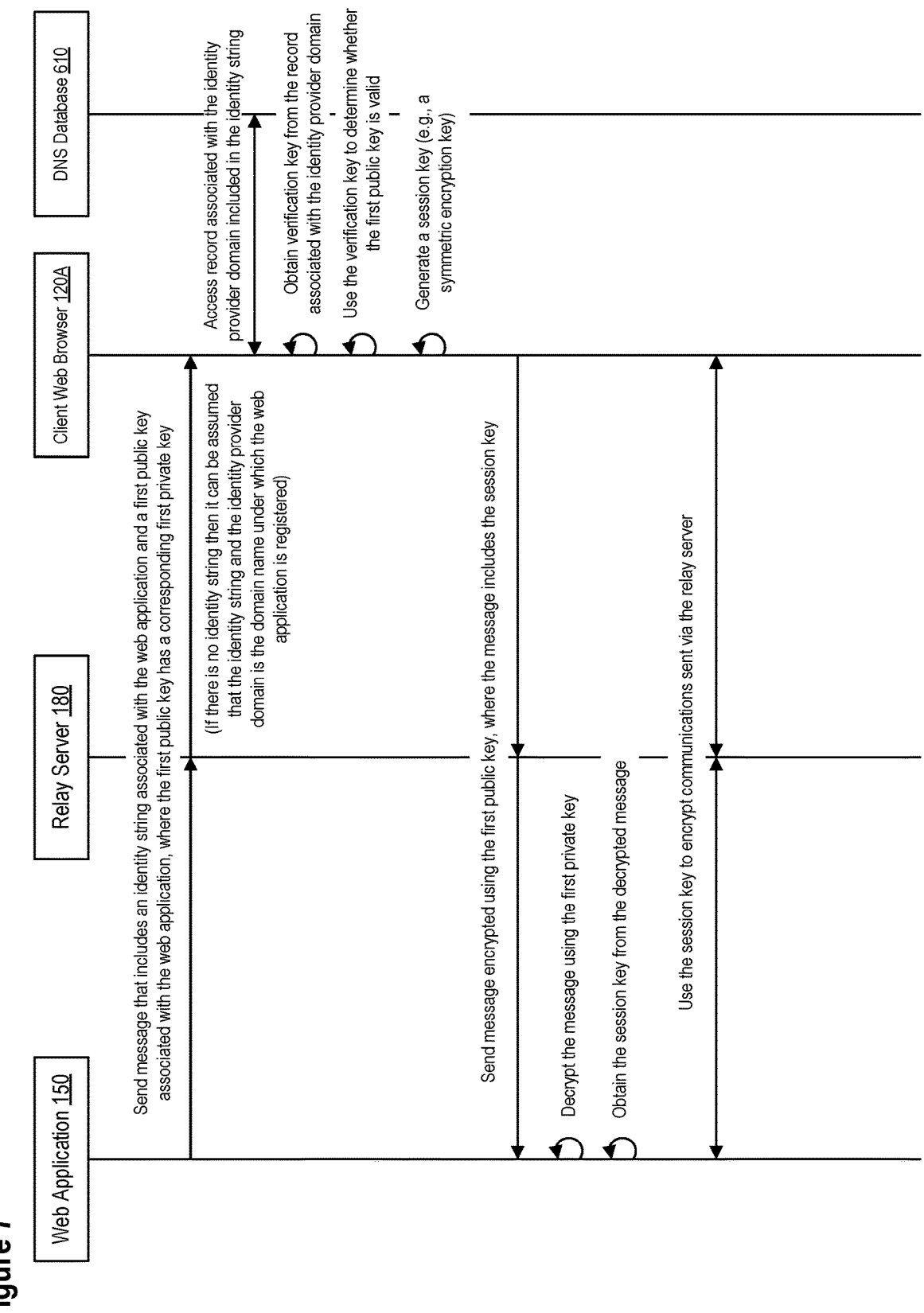
FIG. 7 is a diagram showing operations for providing end-to-end encryption of communications between a web application and a client web browser, through a key exchange and validation mechanism that involves accessing records in the DNS database, according to some embodiments.

FIG. 7 is a diagram showing operations for providing end-to-end encryption of communications between a web application 150 and a client web browser 120A, through a key exchange and validation mechanism that involves accessing records in the DNS database, according to some embodiments.

For ease of description, web browser 120A is described herein as performing certain operations. One having ordinary skill in the art will understand this to mean that the web browser is executing code (e.g., a JavaScript code, WebAssembly code) that includes the instructions to perform those operations. In an embodiment, the code executed by a web browser 120A to enable end-to-end encryption is a part of the code sent by a relay server 180 to establish bidirectional communication connection and retrieve the bootloader code.

As shown in the diagram, the web application 150 sends a message that includes an identity string associated with the web application 150 and a first public key associated with the web application 150, where the first public key has a corresponding first private key. In an embodiment, if there is no identity string included in the message, then it can be assumed that the identity string and identity provider domain is the domain name under which the web application 150 is registered.

Responsive to receiving the message, the client web browser 120A accesses a record associated with the identity provider domain included in the identity string from the DNS database 610. The client web browser 120 then obtains the verification key from the record associated with the identity provider domain and uses the verification key to determine whether the first public key is valid, by checking if the verification key and the first public key may be considered as cryptographically matching keys.

Subsequently, the client web browser 120A may generate a session key which may be a symmetric encryption key that will be used to encrypt messages in this communication session. The client web browser 120A may send a message encrypted using the first public key to the web application 150 (if the first public key is determined to be valid), where the message includes the session key.

Responsive to receiving the message, the web application 150 may decrypt the message using the first private key and obtain the session key from the decrypted message. The web application 150 and the client web browser 120A may then use the session key to encrypt communications sent to each other via the relay server 180.

Alternate Embodiment for End-to-end Encryption

In an embodiment, end-to-end encryption is achieved as follows:

The client (e.g., client web browser 120A or any other application connecting to the web application 150) generates a first unique asymmetric cryptography key pair (a public key and a private key) for a given session. The client sends the public key of the first unique asymmetric cryptography key pair to the web application 150 via the relay server 180. The web application 150 receives the public key from the client via the relay server 180. The web application forms a data to be signed, where the data includes an identity string as claimed by the web application 150 (including an indication of the identity provider domain) and the public key received from the client.

The web application 150 or an external service generates a digital signature of the data to be signed using an encryption key (e.g., a private key) that can be verified against the verification key (e.g., a public key or a fingerprint thereof) published inside a record of a DNS database associated with the identity provider domain.

The web application 150 generates a message that includes the data to be signed and the digital signature. The web application 150 sends the message to the client via the relay server 180.

The client receives this message from the web application 150 via the relay server 180. Responsive to receiving the message, the client extracts the public key and identity string as claimed by the web application 150 from the message. The client compares the received public key to the public key of the first unique asymmetric cryptography key pair expecting them to be the same, and confirms the authenticity and consistency of the message by verifying its signature against the verification key published inside a record of the Domain Name System (DNS) database associated with the identity provider domain.

The web application 150 generates a session key and uses the public key of the first unique asymmetric cryptography key pair to encrypt the session key and send it to the client via the relay server 180. The client uses the private key of the first unique asymmetric cryptography key pair to decrypt the encrypted session key received from the web application 150 via the relay server 180. The web application 150 and the client may then use the session key to encrypt communications sent to each other via the relay server 180.

Client with Identity Verification and App-to-app Communication

In an embodiment, the web application 150 can also confirm the identity string as claimed by the client and establish end-to-end encryption that is opaque to the relay server 180. This may be achieved by performing similar operations as the end-to-end encryption operations described above but with roles being reversed (the web application 150 performs the operations that the client performed and vice versa).

In an embodiment, once the identity of the web application 150 and/or of its client 120A has been confirmed, a Diffie-Hellman or any other suitable key exchange algorithm may be used to establish a session key for end-to-end encryption.

In an embodiment, after the client extracts the identity string as claimed by the web application 150 from the message, the client determines the ability of the web application 150 to be registered under the domain name that the client is connecting to by looking up a record associated with the domain name in a DNS database 610 and verifying it against the identity string as claimed by the web application 150, by previously described means.

In an embodiment, the encryption key is a private key of an asymmetric cryptography algorithm and the verification key is a corresponding public key of the asymmetric cryptography key pair. In another embodiment, the encryption key is a private key of an asymmetric cryptography algorithm and the data to be signed or the message includes a corresponding public key, and the verification key is a fingerprint of the public key. In yet another embodiment, the encryption key is a private key of an asymmetric cryptography algorithm, and the data to be signed or the message includes a chain of trust where the chain's trust anchor's public key or a fingerprint of thereof is the verification key.

Distributed Web Applications

Embodiments may use one or more of the containerization, communication, identity verification, and encryption techniques described herein to allow containerized web applications to communicate, cooperate, and coordinate their actions and state by passing messages between each other across multiple computing devices and end users. This may be used, for example, to provide load balancing of incoming traffic over multiple computing devices and/or allow containerized web applications to coordinate and cooperate with each other to provide user experiences similar to the ones provided by centralized services.

Cross-Container Intra-Domain Communication and Coordination

A technique is described herein that allows for web applications that are registered under the same domain name to communicate and coordinate with each other using a shared broadcast/multicast communication channel provided by a relay server 180.

As an example, three containerized applications being executed on separate computing devices may make themselves available for incoming connections on a particular domain name (all three of the web applications are registered under this particular domain name). As previously described, they may connect to the relay server 180 as appointed by the particular domain name through a bidirectional communication connection and signal that they want to listen for incoming connections on that domain name. The relay server 180 may then allow the web applications to communicate with each other via a shared broadcast/multicast communication channel. Also, when a connection attempt is being made by a client, such information may be broadcasted/multicasted by the relay server 180 to all containerized web applications registered under the same domain name. The web applications may then coordinate with each other to decide which one will handle the incoming request (e.g., the first one to respond and accept may handle the request).

Figure 8:
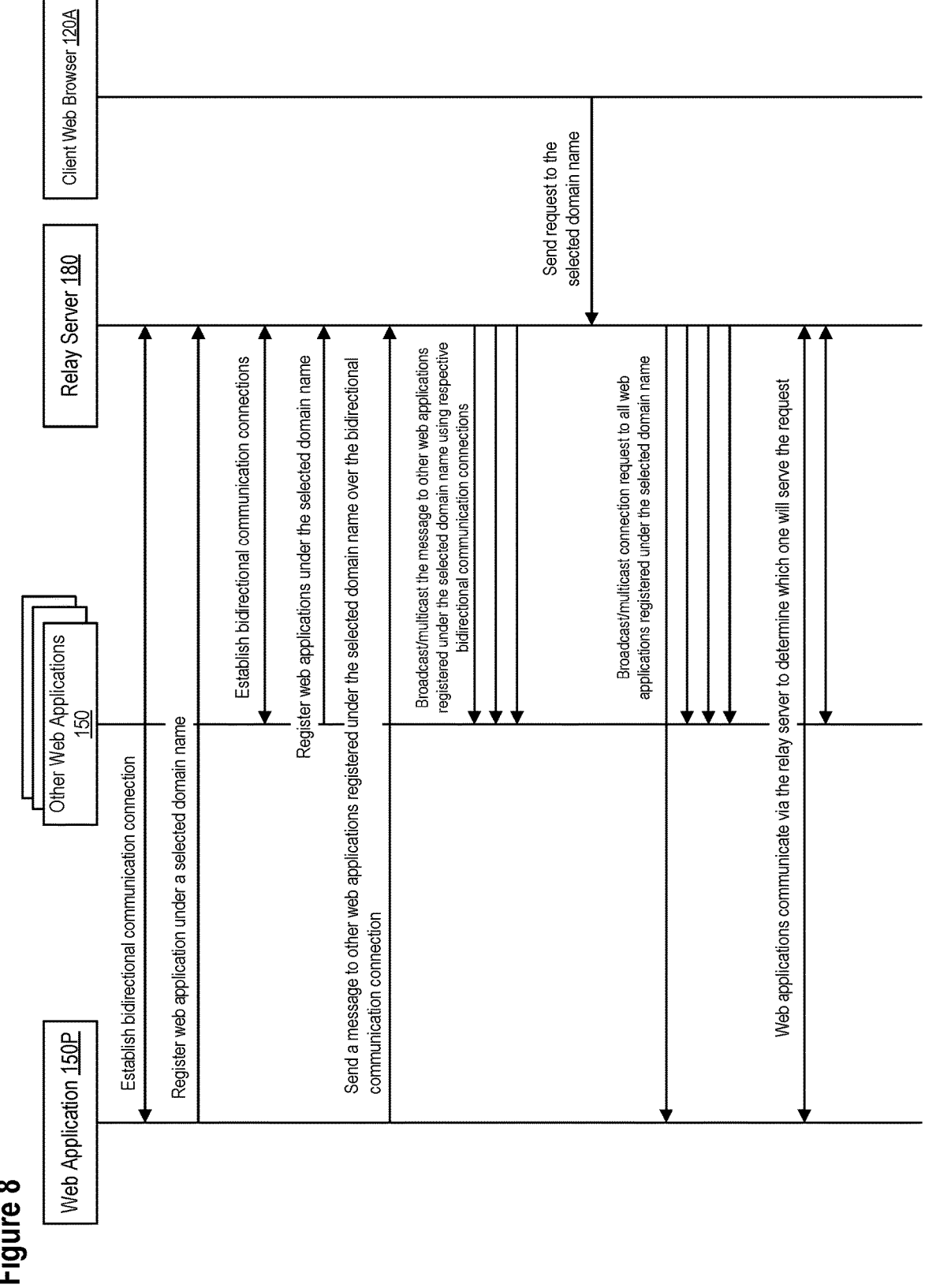
FIG. 8 is a diagram showing operations for performing cross-container intra-domain communication, according to some embodiments.

FIG. 8 is a diagram showing operations for performing cross-container intra-domain communication, according to some embodiments. As shown in the diagram, the web application 150P establishes a bidirectional communication connection with the relay server 180. The web application 150P then registers itself under a selected domain name. One or more other web applications 150 may also establish respective bidirectional communication connections with the relay server 180 and register under the selected domain name (the same domain name that the web application 150P registered under). The web application 150P may then send a message to the other web applications 150 registered under the same domain name over the bidirectional communication connection it established with the relay server 180. The relay server 180 may receive this message and broadcast/multicast it to the other web applications 150 registered under the selected domain name (e.g., over respective bidirectional communication connections).

In an embodiment, as shown in the diagram, the client web browser 120A may send a request (e.g., a HTTP request) to the selected domain name, which is pointed at the relay server 180. Responsive to receiving this request, the relay server 180 may broadcast/multicast a signal indicating that a connection request was received at the selected domain name to all of the web applications 150 registered under that domain name (e.g., over respective bidirectional communication connections). The web applications 150 may then communicate with each other via the relay server 180 (e.g., using the broadcast/multicast functionality of the relay server 180 described above) to determine which one will handle the request.

Cross-Container Cross-Domain Communication and Coordination

A technique is described herein that allows containerized web applications to communicate and coordinate with each other using bidirectional communication connections established with the relay server 180 designated by the domain name of the receiving party.

As an example, a first web application may wish to connect to and download data from a second web application registered under a particular domain name. The first web application may resolve the particular domain name and establish a bidirectional communication connection with the relay server 180 that the particular domain name points to. The first web application may then signal to this relay server 180 that it wishes to connect to the second web application. In response, the relay server 180 may establish a bidirectional communication connection with the second web application. The relay server 180 may then allow the first web application and second web application to communicate with each other over the bidirectional communication connections. Once such communication channel is open, the web applications may use it to communicate with each other, cooperate, and/or exchange data.

Figure 9:
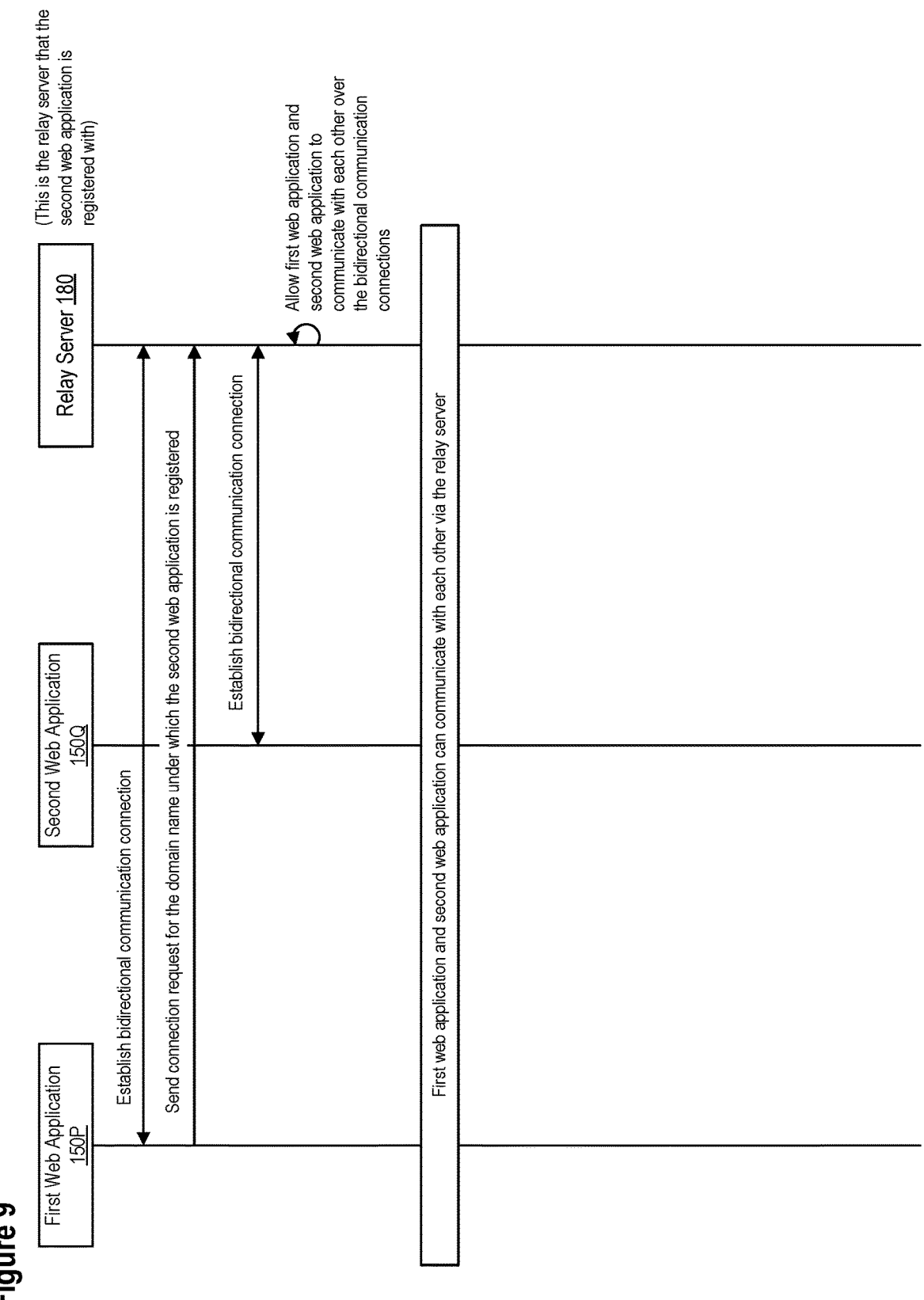
FIG. 9 is a diagram showing operations for performing cross-container cross-domain communication, according to some embodiments.

FIG. 9 is a diagram showing operations for performing cross-container cross-domain communication, according to some embodiments. As shown in the diagram, to communicate with the second web application 150Q, the first web application 150P may establish a first bidirectional communication connection with the relay server 180 that the second web application 150Q is registered with. The first web application 150P may then send a connection request to the relay server 180 (over the first bidirectional communication connection) for the domain name under which the second web application 150Q is registered (which is different from the domain name under which the first web application 150P may be registered). In response, the relay server 180 may establish a second bidirectional communication connection with the second web application 150Q and allow the first web application 150P and the second web application 150Q to communicate with each other over the first and second bidirectional communication connections.

Distributed Data Synchronization

A technique is described herein that allows for secure data synchronization between web applications, which may allow for the dissemination of data even when the web application that created/originated the data is offline. Similar to how the end-to-end data encryption described above is performed, this may be achieved by the web application signing (or encrypting) the data that it wishes to disseminate with an encryption key associated with its claimed identity string, which can be verified through a record in the DNS database.

The web application may then make such data available to its intended recipients. The recipient web applications may download and store such data, as well as the intended recipients list, and allow its copy to be downloaded by other intended recipients. Due to this, a client web application may choose to connect to and query for such data with the original data source, and when it is not available, with any other source that may have a copy of the data. Once it receives such data, it can verify the data's origin, authenticity, and integrity by decrypting it or verifying its signature against the verification key stored in the DNS database for the identity provider domain associated with the identity string of its original creator. The distributed data synchronization may be performed by web applications communicating via a relay server (e.g., as described above) or through other means (e.g., with peer-to-peer connections between web applications (e.g., using WebRTC)).

As an example, a web application may be a social media feed application that a user has installed across multiple computing devices owned by the user (e.g., a mobile phone, a laptop, and/or a desktop computer owned by the user), and that is registered under a single domain name of "social-.johndoe.example", and in which the user has defined a group of other users with which to share the social media feed entries (e.g., using identity strings).

As mentioned above, the web application may be installed on multiple computing devices owned by the same user, and also registered under the same domain name. In such case, the web applications may be able to communicate with each other through a multicast WebSocket channel provided by the relay server (e.g., using the intra-domain communication technique described above). Due to this, the web applications may exchange messages and data (e.g., to synchronize posts and photos across devices), and when an incoming connection is received at the associated domain name, the web applications may collectively decide which of them will be responsible for handling it. For example, the web application installed on the desktop computer may prefer to handle such request as it likely has the most stable Internet connection, or the web application installed on the mobile phone may prefer to do handle such request, as it may have the latest entries, which may have not been downloaded by the web application installed on the desktop yet.

Also, the user may be able to designate a group of friends, and enlist the domain names under which the same or compatible social media feed web applications are published by them. Such list may then be (1) used by the web application to connect to these domain names and download recent entries posted by those friends and (2) make the downloaded entries, as well as the entries posted by the web application owner available for download for all of their intended recipients.

This may function in a fashion that is similar to email. For example, each web application may have a data structure similar to a "shared mailbox" to which other web applications can subscribe to and/or query for messages addressed to them (basing on their claimed identity string). Each web application itself may also be subscribed to or query other web applications (which may be referred to as "peers") and their respective shared mailboxes. Once it receives a message from them, the web application may store the message in its own shared mailbox, and make it available for other intendent recipients.

Figure 10:
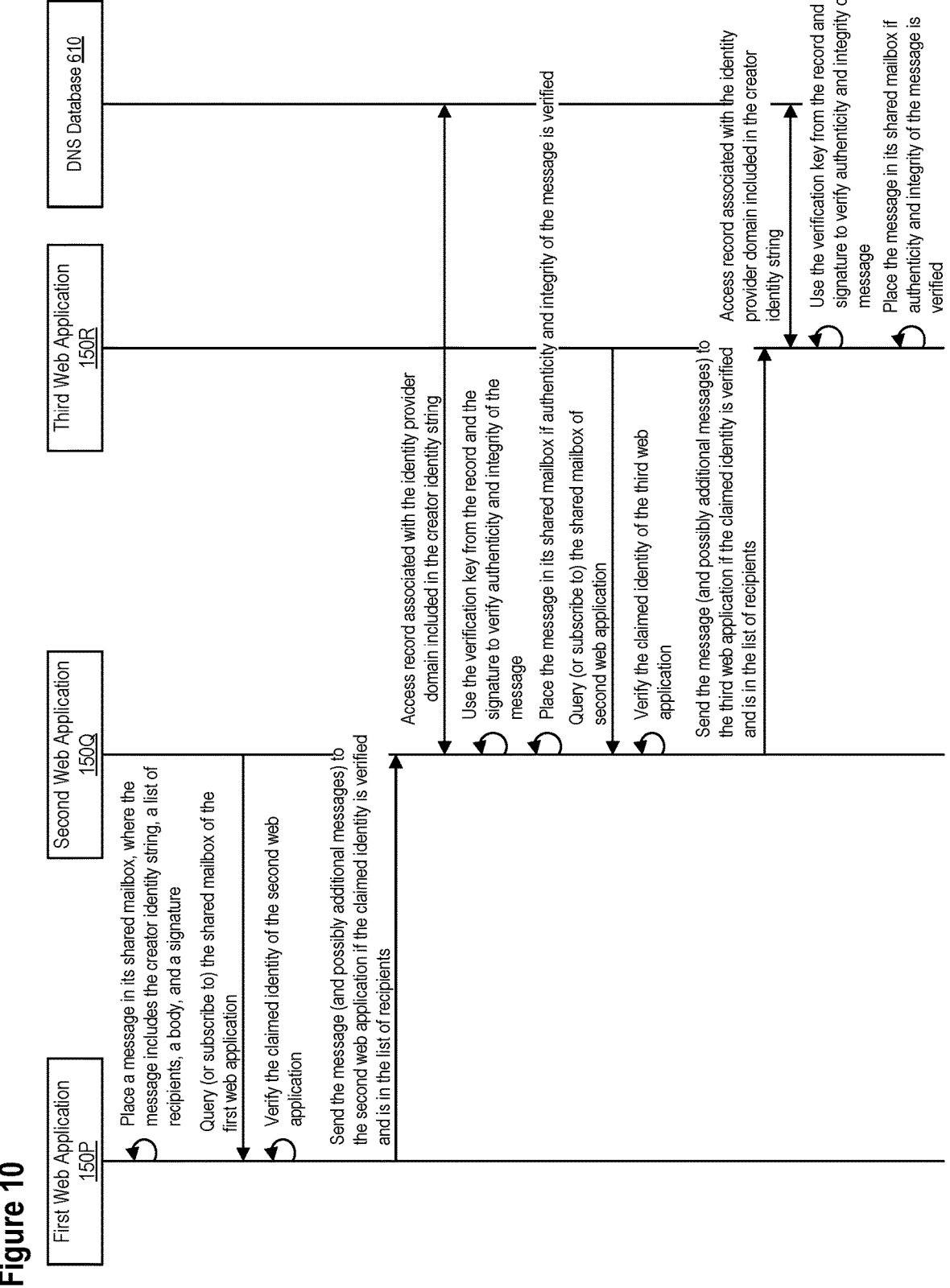
FIG. 10 is a diagram showing operations for performing distributed data synchronization, according to some embodiments.

FIG. 10 is a diagram showing operations for performing distributed data synchronization, according to some embodiments. As shown in the diagram, the first web application 150P places a message in its shared mailbox, where the message includes the creator identity string, a list of recipients (e.g., which may be a list of identity strings, potentially with wildcards such as "*@a.com" which would match all identity strings ending with "@.com"), a body (which includes the data that is being shared), and a signature (for which a verification key is present in a record of the DNS database 610—so the creator signs the message before placing it in its own shared mailbox).

The second web application 150Q may then query (or subscribe to) the shared mailbox of the first web application 150P (e.g., potentially with some filters to filter for messages created after a specified date). In response, the first web application 150P may verify the claimed identity of the second web application 150Q (e.g., using the identity verification techniques described above or similar technique)

and send the message (and possibly additional messages (e.g., messages that match the filter set by the second web application 150Q)) to the second web application 150Q if the claimed identity of the second web application 150Q is verified and is in the list of recipients for the message.

Upon receiving the message, the second web application 150Q may access a record in the DNS database 610 associated with the identity provider domain included in the creator identity string. A web application 150 executing in a web browser does not have browser-based means of accessing records in a DNS database 610 but may use a Fetch API to access a DNS database 610 through DNS over HTTPS protocol or similar means. The second web application 150Q may use the verification key obtained from the record and the signature to verify the authenticity and integrity of the message. The second web application 150Q may place the message in its own shared mailbox if the authenticity and integrity of the message is verified.

Subsequently, the third web application 150R may query (or subscribe to) the shared mailbox of the second web application 150Q. In response, the second web application 150Q may verify the claimed identity of the third web application 150R (e.g., using the identity verification techniques described above or similar technique) and send the message (and possibly additional messages (e.g., messages that match the filter set by the third web application 150R)) to the third web application 150R if the claimed identity of the third web application 150R is verified and is in the list of recipients for the message.

Upon receiving the message, the third web application 150R may access the record in the DNS database 610 associated with the identity provider domain included in the creator identity string. The third web application 150R may use the verification key obtained from the record and the signature to verify the authenticity and integrity of the message. The third web application 150R may place the message in its own shared mailbox if the authenticity and integrity of the message is verified. In this way, the second web application 150Q and the third web application 150R may make the message originally shared by the first web application 150P available to intended recipients even when the first web application 150P is offline. In addition, any recipients may be able to verify the authenticity of the message (e.g., that it is from the first web application 150P), and integrity of the message (e.g., that it has not been modified by the second web application 150P, or any other web application it has been forwarded through).

Each web application may have a list of "peers" to which it is subscribed to or which it intends to query for messages—this may be a list of domain names of other web applications. This list may be provided by a user or discovered and managed by the web application itself. Different web applications may use different ways to suggest and discover potential peers.

The difference between "subscribe" and "query" as used herein is that subscriptions are generally long-lived and return new results as they appear (e.g., through live updates), whereas queries are generally made ad hoc, and return results upon request. Identity strings may be the same or similar as described above. For example, they may be as simple as a single domain name ("a.example") or even more complex ("john@a.example" or "john@b.example:a.example"), as long as web applications are able to determine which domain name is functioning as the identity provider domain (e.g., through a built-in identity string parsing mechanism that is compatible between the communicating web applications). The creator/recipient(s) of a message may be represented as identity strings, but the peers may be represented as domain names under which other web applications are registered. When a subscription to a peer is made, the web application may claim multiple identities (e.g., an application may have one primary identity and any number of secondary identities associated with groups that the user belongs to). For example, the web application may claim both "john@acme.example" and "managers@acme.example" as identities, and that would be allowed so long as the web application is able to provide a valid signature for each of the identities that it is claiming. The verification technique used here may be the same or similar to the one used by the relay server, or to the one used to establish end-to-end encryption, as described above. The original message (which includes the identity string of its creator) may be signed (directly by its creator or by a third-party service to which the creator delegated signing) with a private key for which a public key or its fingerprint is present in the DNS database (under the identity provider's domain). The message may include the complete public key when only a fingerprint thereof is present in the DNS database. The message may also be signed with and/or include certificates that form a chain-of-trust, for which the public key or fingerprint of thereof of the trust anchor is present in the DNS database for the identity provider domain. The body of the message may include any type of data that the web application wishes to share with other web applications (e.g., a social media entry or a file).

An embodiment is a method performed by a first web application for sharing data with other recipient web applications, such that the recipient web applications can further disseminate such data to and between each other and still be able to independently confirm the data's authenticity and integrity. The method may include including as part of the data, the identity string that includes an indication of the identity provider domain, computing by the first web application or an external service, a digital signature of the data, using an encryption key that can be validated against the verification key published inside a record of a DNS database associated with the identity provider domain, constructing a message which includes a data and its digital signature, transmitting the message or making it available to one or more of the available recipients, where a recipient, upon receipt of such data, may transmit or make it available to others of the recipients, and where each recipient can independently confirm the authenticity and consistency of the data by validating it against the verification key published inside the record of the DNS database associated with the identity provider domain of the identity string as included in the data. In an embodiment, the encryption key is a private key of an asymmetric cryptography algorithm, and the verification key is a matching public key. In an embodiment, the encryption key is a private key of an asymmetric cryptography algorithm, the data or the message includes a corresponding public key, and the verification key is a fingerprint of the public key. In an embodiment, the encryption key is a private key of an asymmetric cryptography algorithm, and the data or the message includes a chain of trust where the chain's trust anchor's public key or fingerprint of thereof is the verification key. In an embodiment, the data or message further includes an indication of the origin domain name of the first web application (from which the data was shared), and where each recipient can independently confirm the ability of the first web application to be registered under said domain name by looking up a record of a DNS database associated with the domain name, and expecting to find a reference to the identity string as included in the data.

FIG. 11 is a flow diagram showing a method performed by a web server for installing a web application into a container within a web browser, according to some embodiments. The method may be implemented using hardware, software, firmware, or any combination thereof.

The operations in the flow diagrams are described with reference to the exemplary embodiments of the other diagrams. However, it should be understood that the operations of the flow diagrams can be performed by embodiments other than those discussed with reference to these other diagrams, and the embodiments discussed with reference to these other diagrams can perform operations different than those discussed with reference to the flow diagrams. Also, while the flow diagrams show a particular order of operations performed by certain embodiments, it should be understood that such order is provided as an example (e.g., alternative embodiments may perform the operations in a different order, combine certain operations, overlap certain operations, etc.).

At block 1110, the web server receives, at a domain name pointed at the web server, a request to install the web application in the web browser, wherein the request to install the web application includes an indication of a collection of files associated with the web application.

At block 1120, responsive to receiving the request to install the web application, send a container management code to the web browser to be executed by the web browser, wherein the container management code includes code to store the collection of files associated with the web application in a storage location that is scoped to the domain name and register a mechanism (e.g., a Service Worker) that is to serve one or more of the collection of files upon request to form a containerized web application.

In an embodiment, as shown in block 1125, the container management code further includes code to load/evaluate a file from the collection of files that is designated as an entry point of the containerized web application responsive to a request to execute the containerized web application.

In an embodiment, as shown in block 1130, the container management code further includes code to export and/or import data associated with a container. As an example, the container management code may further include code to gather data from one or more storage locations scoped to the domain name, save the gathered data as one or more files, and provide the one or more files to an end user of the web browser responsive to a request to export data associated with a container. As an example, the container management code may further include code to access one or more files that contain data to be imported and store the data contained in the one or more files in one or more storage locations scoped to the domain name responsive to a request to import data associated with a container.

In an embodiment, as shown in block 1140, the container management code further includes code to take and/or restore a snapshot of the containerized web application. As an example, the container management code may further include code to send a signal to the containerized web application to pause execution, take a snapshot of the containerized web application that includes a runtime state of the containerized web application, provide the snapshot of the containerized web application to an end user of the web browser, and send a signal to the containerized web application to resume execution after the snapshot of the containerized web application has been taken responsive to a request to take a snapshot of the containerized web application. In an embodiment, the request to take the snapshot of the containerized web application is sent to a window of the web browser executing the container management code using a cross-window communication interface. As an example, the container management code may further include code to send a signal to the containerized web application to pause execution (if the containerized web application is running), update a runtime state of the containerized web application to match the runtime state included in the snapshot of the containerized web application, and start execution of the containerized web application or send a signal to the containerized web application to resume execution (if execution of the containerized web application was previously paused) after the runtime state of the containerized web application is updated responsive to a request to restore the snapshot of the containerized web application.

In an embodiment, as shown in block 1150, the container management code further includes code to export and/or import an image of a container. As an example, the container management code may further include code to export an image of a container responsive to a request to export the image of the container, wherein the image of the container includes application files and data associated with the containerized web application, together with any number of data export files and snapshot files. Also, as an example, the container management code may include code to import the image of the container responsive to a request to import the image of the container.

In an embodiment, as shown in block 1160, the container management code further includes code to erase a container.

In an embodiment, as shown in block 1170, the container management code further includes code to uninstall the web application from a container.

In an embodiment, as shown in block 1180, the container management code further includes code to retrieve and execute a bootloader code associated with the containerized web application.

FIG. 12 is a flow diagram showing a method performed by a relay server for facilitating communications between a web application executing in a web browser of a source computing device and web browsers of one or more client computing devices, according to some embodiments. The method may be implemented using hardware, software, firmware, or any combination thereof.

At block 1210, the relay server registers the web application under a selected domain name that is pointed at the relay server. In an embodiment, the relay server receives a bootloader code associated with the web application from the web application over the first bidirectional communication connection and send the bootloader code to a first web browser of the web browsers of the one or more client computing devices over a second bidirectional communication connection established between the relay server and the first web browser, wherein the bootloader code is to be executed by the first web browser and includes code to communicate with the web application via the relay server over the first bidirectional communication connection and the second bidirectional communication connection. In an embodiment, the bootloader code further includes code to load resources associated with the web application.

At block 1220, the relay server relays messages received from the web browsers of the one or more client computing devices at the selected domain name to the web application over a first bidirectional communication connection established between the web application and the relay server.

At block 1230, the relay server relays messages received from the web application over the first bidirectional communication connection to respective ones of the web browsers of the one or more client computing devices.

In an embodiment, the relay server receives a request from the web application over the first bidirectional communication connection to relay HTTP requests received at a specified path of the selected domain name to the web application and registers a handler for relaying HTTP requests received at the specified path of the selected domain name to the web application over the first bidirectional communication connection in response to receiving the request.

In an embodiment, the relay server receives a request from the web application over the first bidirectional communication connection to relay email messages received at the selected domain name to the web application and registers a handler for relaying contents of email messages received from mail transfer agents at the selected domain name to the web application over the first bidirectional communication connection in response to receiving the request.

In an embodiment, the relay server receives a request from the web application over the first bidirectional communication connection to serve static content when the relay server receives a request at a specified path of the selected domain name and registers a handler for serving the static content without involving the web application when the relay server receives a request at the specified path of the selected domain name in response to receiving the request.

In an embodiment, the relay server receives a request from the web application over the first bidirectional communication connection to execute a particular code when the relay server receives a request at a specified path of the selected domain name and registers a handler for executing the particular code without involving the web application when the relay server receives a request at the specified path of the selected domain name in response to receiving the request.

In an embodiment, the relay server receives a token that is signed using an encryption key associated with an identity provider domain, wherein the token includes an identity string that includes an indication of the identity provider domain, accesses a record associated with the identity provider domain in a DNS database, obtains a verification key associated with the identity provider domain from the record associated with the identity provider domain, and uses the verification key associated with the identity provider domain to determine whether the token is valid (for identity verification).

In an embodiment, the relay server verifies that a claimed identity associated with the web application is allowed to register a web application under the selected domain name based on accessing a record associated with the selected domain name in the DNS database.

In an embodiment, the web application and a first web browser of the web browsers of the one or more client computing devices communicate with each other via the relay server using end-to-end encryption that is opaque to the relay server, wherein the end-to-end encryption is achieved through a key exchange and validation mechanism that involves accessing records in a DNS database.

In an embodiment, the relay server receives a message from the web application over the first bidirectional communication connection and sends the message to one or more other web applications that are also registered under the selected domain name over respective bidirectional communications established with the one or more other web applications.

Figure 13:
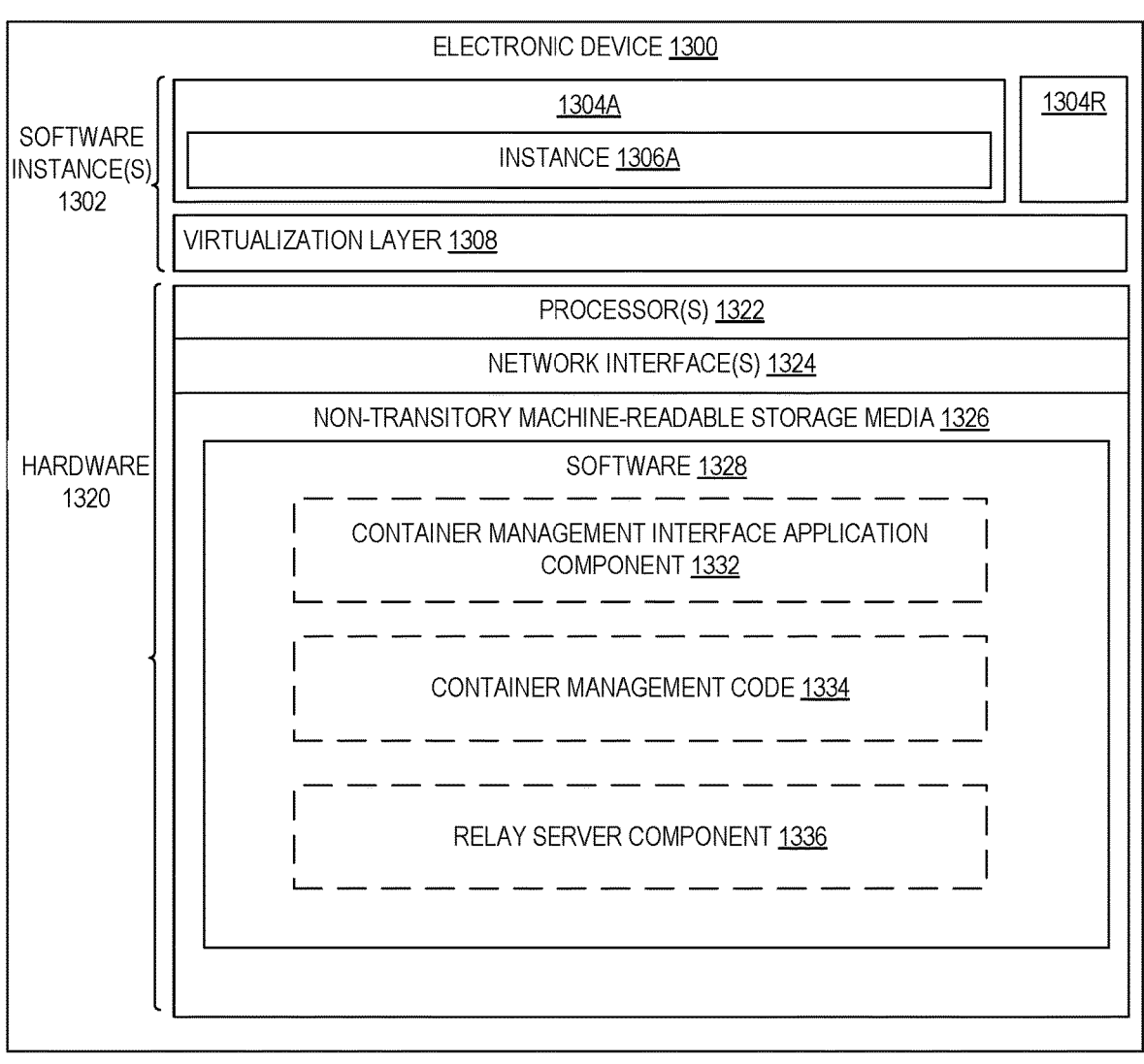
FIG. 13 is a diagram showing an electronic/network device, according to some embodiments.

FIG. 13 is a diagram showing an electronic/network device, according to some embodiments. FIG. 13 illustrates hardware 1320 comprising a set of one or more processor(s) 1322, a set of one or more network interfaces 1324 (wireless and/or wired), and non-transitory machine-readable storage medium/media 1326 having stored therein software 1328 (which includes instructions executable by the set of one or more processor(s) 1322). Software 1328 can include code such as container management interface application component 1332 and/or relay server component 1336, which when executed by hardware 1320, causes the electronic device 1300 to perform operations of one or more embodiments described herein (e.g., operations of the container management interface application 140 and relay server 180, respectively). In an embodiment, software 1328 includes container management code 1334 (e.g., the container management code 170 described herein above).

In electronic devices that use compute virtualization, the set of one or more processor(s) 1322 typically execute software to instantiate a virtualization layer 1308 and software container(s) 1304A-R (e.g., with operating system-level virtualization, the virtualization layer 1308 represents the kernel of an operating system (or a shim executing on a base operating system) that allows for the creation of multiple software containers 1304A-R (representing separate user space instances and also called virtualization engines, virtual private servers, or jails) that may each be used to execute a set of one or more applications; with full virtualization, the virtualization layer 1308 represents a hypervisor (sometimes referred to as a virtual machine monitor (VMM)) or a hypervisor executing on top of a host operating system, and the software containers 1304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1328 (illustrated as instance 1306A) is executed within the software container 1304A on the virtualization layer 1308. In electronic devices where compute virtualization is not used, the instance 1306A on top of a host operating system is executed on the "bare metal" electronic device 1300. The instantiation of the instance 1306A, as well as the virtualization layer 1308 and software containers 1304A-R if implemented, are collectively referred to as software instance(s) 1302.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a relay server for facilitating communications between a web application executing in a web browser of a source computing device and one or more client computing devices, the method comprising:

receiving a selected domain name under which the web application executing in the web browser is to be registered and an identity string that is claimed by the web application, wherein the web application is executed entirely in the web browser;

verifying that the web application is allowed to be registered under the selected domain name based on accessing a record associated with the selected domain name in a domain name system (DNS) database and verifying that the record associated with the selected domain name references the identity string, wherein the identity string is separate from a network address associated with the web application;

registering the web application under the selected domain name in response to verifying that the web application is allowed to be registered under the selected domain name;

relaying messages associated with the selected domain name that are received from the one or more client computing devices to the web application over a first bidirectional communication connection established between the web application and the relay server;

relaying second messages received from the web application over the first bidirectional communication connection to respective ones of the one or more client computing devices;

receiving a request from the web application over the first bidirectional communication connection to execute a particular code provided by the web application when the relay server receives requests at the selected domain name; and registering a handler for executing the particular code provided by the web application without involving the web application when the relay server receives the requests at the selected domain name.

2. The method of claim 1, further comprising:

receiving a bootloader code associated with the web application from the web application over the first bidirectional communication connection; and sending the bootloader code to a first web browser executed by one of the one or more client computing devices over a second bidirectional communication connection established between the relay server and the first web browser, wherein the bootloader code is to be executed by the first web browser and includes code to communicate with the web application via the relay server over the first bidirectional communication connection and the second bidirectional communication connection.

3. The method of claim 2, wherein the bootloader code further includes code to load resources associated with the web application.

4. The method of claim 1, further comprising:

receiving a request from the web application over the first bidirectional communication connection to relay Hypertext Transfer Protocol (HTTP) requests received at the selected domain name to the web application; and registering a handler for relaying HTTP requests received at the selected domain name to the web application over the first bidirectional communication connection.

5. The method of claim 1, further comprising:

receiving a request from the web application over the first bidirectional communication connection to relay email messages received at the selected domain name to the web application; and registering a handler for relaying contents of email messages received from mail transfer agents at the selected domain name to the web application over the first bidirectional communication connection.

6. The method of claim 1, further comprising:

receiving a request from the web application over the first bidirectional communication connection to serve static content when the relay server receives requests at a specified path of the selected domain name; and registering a handler for serving the static content without involving the web application when the relay server receives the requests at the specified path of the selected domain name.

7. The method of claim 1, further comprising:

receiving a token that is signed using an encryption key associated with an identity provider domain;

accessing a record associated with the identity provider domain in the DNS database;

obtaining a verification key associated with the identity provider domain from the record associated with the identity provider domain;

using the verification key associated with the identity provider domain to determine whether the token is valid; and verifying the identity string based on a result of the determination of whether the token is valid.

8. The method of claim 1, wherein the record associated with the selected domain name references the identity string using a wildcard.

9. The method of claim 1, wherein the web application and a first web browser executed by one of the one or more client computing devices communicate with each other via the relay server using end-to-end encryption that is opaque to the relay server, wherein the end-to-end encryption is achieved through a key exchange and validation mechanism that involves accessing records in the DNS database.

10. The method of claim 1, further comprising:

receiving a message from the web application over the first bidirectional communication connection; and sending the message to one or more other web applications that are also registered under the selected domain name over respective bidirectional communications established with the one or more other web applications.

11. The method of claim 1, wherein the web browser stores a collection of files associated with the web application in a non-volatile storage location managed by the web browser that is scoped to a domain name that is the same as the selected domain name or different from the selected domain name, wherein the web browser has a mechanism registered therein that serves one or more files from the collection of files associated with the web application upon request.

12. A network device configured to implement a relay server for facilitating communication between a web application executing in a web browser of a source computing device and one or more client computing devices, the network device comprising:

one or more processors; and a non-transitory machine-readable storage medium storing instructions that, when executed by the one or more processors, causes the relay server to:

receive a selected domain name under which the web application executing in the web browser is to be registered and an identity string that is claimed by the web application, wherein the web application is executed entirely in the web browser, verify that the web application is allowed to be registered under the selected domain name based on accessing a record associated with the selected domain name in a domain name system (DNS) database and verifying that the record associated with the selected domain name references the identity string, wherein the identity string is separate from a network address associated with the web application, register the web application under the selected domain name in response to verifying that the web application is allowed to be registered under the selected domain name, relay messages associated with the selected domain name that are received from the one or more client computing devices to the web application over a first bidirectional communication connection established between the web application and the relay server, relay second messages received from the web application over the first bidirectional communication connection to respective ones of the one or more client computing devices, receive a request from the web application over the first bidirectional communication connection to execute a particular code provided by the web application when the relay server receives requests at the selected domain name, and register a handler for executing the particular code provided by the web application without involving the web application when the relay server receives the requests at the selected domain name.

13. The network device of claim 12, wherein the instructions, when executed by the one or more processors, further causes the relay server to:

receive a bootloader code associated with the web application from the web application over the first bidirectional communication connection; and send the bootloader code to a first web browser executed by one of the one or more client computing devices over a second bidirectional communication connection established between the relay server and the first web browser, wherein the bootloader code is to be executed by the first web browser and includes code to communicate with the web application via the relay server over the first bidirectional communication connection and the second bidirectional communication connection.

14. The network device of claim 13, wherein the bootloader code further includes code to load resources associated with the web application.

15. The network device of claim 12, wherein the instructions, when executed by the one or more processors, further causes the relay server to:

receive a request from the web application over the first bidirectional communication connection to relay Hypertext Transfer Protocol (HTTP) requests received at the selected domain name to the web application and register a handler for relaying HTTP requests received at the selected domain name to the web application over the first bidirectional communication connection.

16. The network device of claim 12, wherein the instructions, when executed by the one or more processors, further causes the relay server to:

receive a request from the web application over the first bidirectional communication connection to relay email messages received at the selected domain name to the web application and register a handler for relaying contents of email messages received from mail transfer agents at the selected domain name to the web application over the first bidirectional communication connection.

17. The network device of claim 12, wherein the instructions, when executed by the one or more processors, further causes the relay server to:

receive a token that is signed using an encryption key associated with an identity provider domain;

access a record associated with the identity provider domain in the DNS database;

obtain a verification key associated with the identity provider domain from the record associated with the identity provider domain;

use the verification key associated with the identity provider domain to determine whether the token is valid; and verify the identity string based on a result of the determination of whether the token is valid.

18. A non-transitory machine-readable storage medium storing instructions that, when executed by a network device implementing a relay server, causes the relay server to perform operations for facilitating communication between a web application executing in a web browser of a source computing device and one or more client computing devices, the operations comprising:

receiving a selected domain name under which the web application executing in the web browser is to be registered and an identity string that is claimed by the web application, wherein the web application is executed entirely in the web browser;

verifying that the web application is allowed to be registered under the selected domain name based on accessing a record associated with the selected domain name in a domain name system (DNS) database and verifying that the record associated with the selected domain name references the identity string, wherein the identity string is separate from a network address associated with the web application;

registering the web application under the selected domain name in response to verifying that the web application is allowed to be registered under the selected domain name;

relaying messages associated with the selected domain name that are received from the one or more client computing devices to the web application over a first bidirectional communication connection established between the web application and the relay server;

relaying second messages received from the web application over the first bidirectional communication connection to respective ones of the one or more client computing devices;

receiving a request from the web application over the first bidirectional communication connection to execute a particular code provided by the web application when the relay server receives requests at the selected domain name; and registering a handler for executing the particular code provided by the web application without involving the web application when the relay server receives the requests at the selected domain name.

19. The non-transitory machine-readable storage medium of claim 18, wherein the operations further comprise:

receiving a bootloader code associated with the web application from the web application over the first bidirectional communication connection; and sending the bootloader code to a first web browser executed by one of the one or more client computing devices over a second bidirectional communication connection established between the relay server and the first web browser, wherein the bootloader code is to be executed by the first web browser and includes code to communicate with the web application via the relay server over the first bidirectional communication connection and the second bidirectional communication connection.

20. The non-transitory machine-readable storage medium of claim 18, wherein the operations further comprise:

receiving a token that is signed using an encryption key associated with an identity provider domain;

accessing a record associated with the identity provider domain in the DNS database;

obtaining a verification key associated with the identity provider domain from the record associated with the identity provider domain;

using the verification key associated with the identity provider domain to determine whether the token is valid; and verifying the identity string based on a result of the determination of whether the token is valid.

* * * * *